(12) United States Patent
Jeon et al.

(10) Patent No.: US 12,707,437 B2
(45) Date of Patent: Aug. 11, 2026

(54) SENSING RESOURCE CONFIGURATION AND COEXISTENCE HANDLING IN CELLULAR SYSTEMS

(71) Applicant: Samsung Electronics Co., Ltd., Suwon-si (KR)

(72) Inventors: Jeongho Jeon, San Jose, CA (US); Ebrahim MolavianJazi, Santa Clara, CA (US); Caleb K. Lo, San Jose, CA (US); Pranav Madadi, Sunnyvale, CA (US); Daoud Burghal, San Diego, CA (US); Joonyoung Cho, Portland, OR (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 587 days.

(21) Appl. No.: 18/190,882

(22) Filed: Mar. 27, 2023

(65) Prior Publication Data

US 2023/0362898 A1 Nov. 9, 2023

Related U.S. Application Data

(60) Provisional application No. 63/338,491, filed on May 5, 2022, provisional application No. 63/337,865, filed on May 3, 2022.

(51) Int. Cl.

| | |
|---|---|
| ***H04W 72/04*** | (2023.01) |
| ***H04W 72/0446*** | (2023.01) |
| ***H04W 72/0453*** | (2023.01) |
| ***H04W 72/0457*** | (2023.01) |

(52) U.S. Cl.
CPC ... *H04W 72/0446* (2013.01); *H04W 72/0453* (2013.01); *H04W 72/0457* (2023.01)

(58) Field of Classification Search
CPC ......... H04W 72/0446; H04W 72/0457; H04W 72/0453
See application file for complete search history.

(56) References Cited

U.S. PATENT DOCUMENTS

2019/0293781 A1* 9/2019 Bolin .................... G01S 13/003
2020/0015272 A1 1/2020 Lee et al.

(Continued)

FOREIGN PATENT DOCUMENTS

WO 2022060541 A1 3/2022

OTHER PUBLICATIONS

International Search Report and Written Opinion issued Jul. 18, 2023 regarding International Application No. PCT/KR2023/005952, 7 pages.

(Continued)

*Primary Examiner* — Brenda H Pham

(57) ABSTRACT

A time domain resource configuration indicates a time domain resource for sensing operations by a user equipment, and a frequency domain resource configuration indicates a bandwidth part (BWP) for the sensing operations. The user equipment performs the sensing operations using the indicated time domain resource and the indicated bandwidth part. The time domain resource configuration may include a sensing type indicator S for the time domain resource for sensing operations, and may indicate that dynamic triggering of sensing is allowed. The BWP for the sensing operations may comprise BWP(s) selectively activated for the sensing operations, and may indicate BWP(s) that overlap a BWP used for cellular communication. Assistance information for interference between sensing operations and cellular communication may be transmitted by the user equipment, (Continued)

1100
1101 A UE receives time domain resource configuration from the NW on slot format indication including time domain resource for sensing operation
1102 A UE receives frequency domain resource configuration from the NW on BWP indication including BWP for sensing operation and the active BWP
1103 The UE performs sensing operation on the indicated time/frequency domain resources UE 116
NW 710
Sensing interference cannot be resolved by UE 1501
Indication with assistance information 1502
Optional measurement configuration 1503
RRM measurement report 1504
Network determines JCS coexistence solution 1505
Configures coexistence solution (TDM, FDM, etc.) 1506
1500 which may subsequently receive a configuration for coexistence of the sensing operations and the cellular communication.

20 Claims, 17 Drawing Sheets

(56) References Cited

U.S. PATENT DOCUMENTS

| | | | | |
|---|---|---|---|---|
| 2020/0107249 | A1 | 4/2020 | Stauffer et al. | |
| 2021/0127359 | A1 | 4/2021 | Takeda et al. | |
| 2022/0095319 | A1 | 3/2022 | Duan et al. | |
| 2022/0256519 | A1* | 8/2022 | Jeon | G01S 7/0235 |
| 2022/0349984 | A1* | 11/2022 | Agardh | G01S 7/006 |
| 2024/0430067 | A1* | 12/2024 | Jiang | H04W 74/0833 |
| 2025/0271896 | A1* | 8/2025 | Jumbe | A61B 5/0205 |

OTHER PUBLICATIONS

"3rd Generation Partnership Project; Technical Specification Group Radio Access Network; NR; Physical channels and modulation (Release 16)", 3GPP TS 38.211 v16.4.0, Dec. 2020, 133 pgs.

"3rd Generation Partnership Project; Technical Specification Group Radio Access Network; NR; Multiplexing and channel coding (Release 16)", 3GPP TS 38.212 v16.4.0, Dec. 2020, 152 pgs.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 v16.4.0, Dec. 2020, 169 pgs.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.0, Dec. 2020, 932 pgs.

"3rd Generation Partnership Project; Technical Specification Group Radio Access Network; NR; NR and NG-RAN Overall Description; Stage 2 (Release 16)", 3GPP TS 38.300 v16.4.0, Dec. 2020, 149 pgs.

* cited by examiner

UE
116

NW
710

Indication of sensing capability
701

Sensing configuration REQ
702

Sensing configuration
703

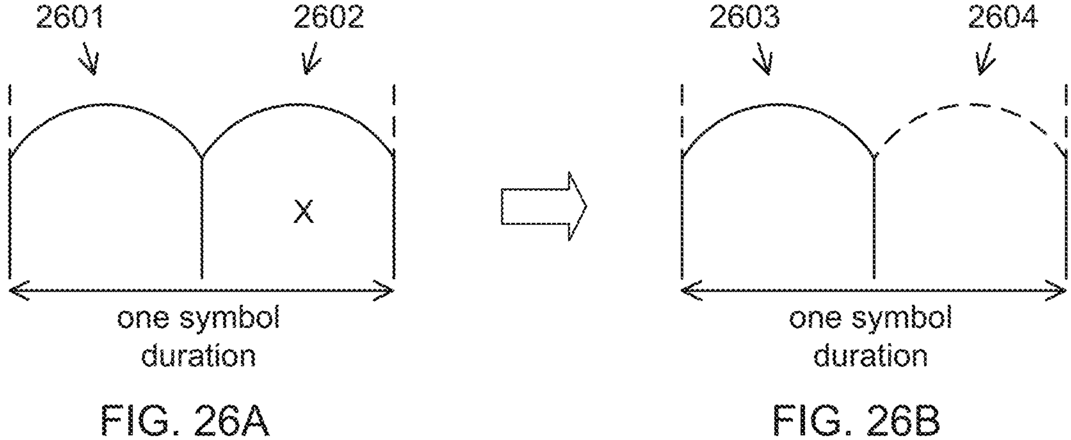
FIG. 26A
FIG. 26B
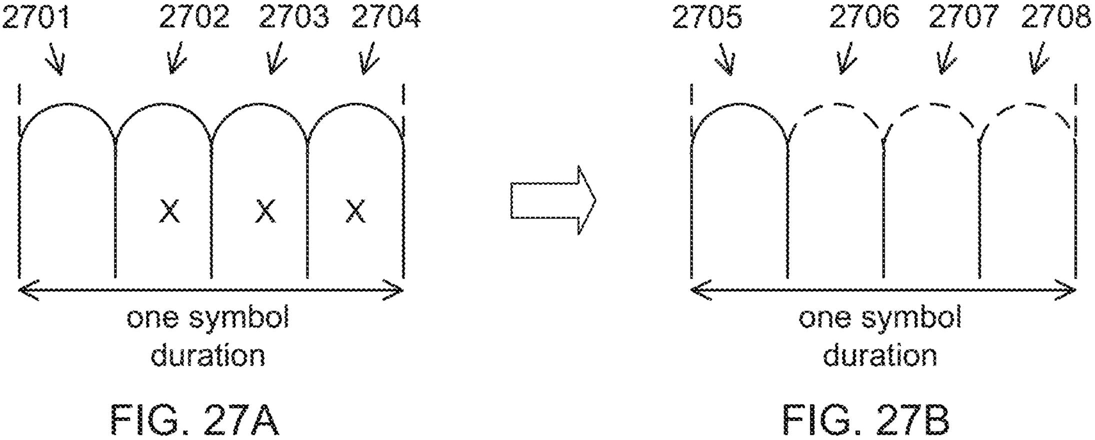
FIG. 27A
FIG. 27B

SENSING RESOURCE CONFIGURATION AND COEXISTENCE HANDLING IN CELLULAR SYSTEMS

CROSS-REFERENCE TO RELATED APPLICATION AND CLAIM OF PRIORITY

This application claims priority under 35 U.S.C. § 119(e) to U.S. Provisional Patent Application No. 63/338,491 filed May 5, 2022 and U.S. Provisional Patent Application No. 63/337,865 filed May 3, 2022. The content of the above-identified patent document(s) is incorporated herein by reference.

TECHNICAL FIELD

The present disclosure relates generally to joint communication and sensing in user equipment, and more specifically to sensing resource configuration and coexistence configuration for joint communication and sensing in user equipment.

BACKGROUND

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

SUMMARY

A time domain resource configuration indicates a time domain resource for sensing operations by a user equipment, and a frequency domain resource configuration indicates a bandwidth part (BWP) for the sensing operations. The user equipment performs the sensing operations using the indicated time domain resource and the indicated bandwidth part. The time domain resource configuration may include a sensing type indicator S for the time domain resource for sensing operations, and may indicate that dynamic triggering of sensing is allowed. The BWP for the sensing operations may comprise BWP(s) selectively activated for the sensing operations, and may indicate BWP(s) that overlap a BWP used for cellular communication. Assistance information for interference that cannot be resolved between sensing operations and cellular communication may be transmitted by the user equipment, which may subsequently receive a configuration for coexistence of the sensing operations and the cellular communication.

In a first embodiment, a method includes receiving, at a user equipment (UE), a time domain resource configuration indicating a time domain resource for sensing operations by the UE. The method further includes receiving, at the UE, a frequency domain resource configuration indicating a bandwidth part (BWP) for the sensing operations by the UE. The method also includes performing, at the UE, the sensing operations using the indicated time domain resource and the indicated bandwidth part.

In a second embodiment, a user equipment (UE) includes a transceiver configured to receive a time domain resource configuration indicating a time domain resource for sensing operations by the UE, and to receive a frequency domain resource configuration indicating a bandwidth part (BWP) for the sensing operations by the UE. The UE further includes a processor operably coupled to the transceiver and configured to perform the sensing operations using the indicated time domain resource and the indicated bandwidth part.

In a third embodiment, a base station (BS) includes a transceiver configured to transmit a time domain resource configuration indicating a time domain resource for sensing operations by the UE, and to transmit a frequency domain resource configuration indicating a bandwidth part (BWP) for the sensing operations by the UE. The sensing operations are performed using the indicated time domain resource and the indicated bandwidth part.

In any of the preceding embodiments, the time domain resource configuration may include a sensing type indicator S for the time domain resource for sensing operations by the UE, and the time domain resource configuration may indicate that dynamic triggering of sensing is allowed within one or more time domain resources. The time domain resource configuration may be one of a plurality of slot format indicators for a pattern of time domain resources allocated for one of downlink (DL) data reception by the UE, uplink (UL) data transmission by the UE, sensing transmission by the UE, or sensing reception by the UE.

In any of the preceding embodiments, the BWP for the sensing operations by the UE may include a BWP defined by a cellular communication system. The BWP for the sensing operations by the UE may include one or more BWPs that may be selectively activated for the sensing operations by the UE. The BWP for the sensing operations by the UE may overlap a BWP used for cellular communication by the UE.

In any of the preceding embodiment, the UE may transmit assistance information relating to interference between the sensing operations by the UE and cellular communication by the UE that cannot be resolved by the UE, and may receive an interference measurement configuration for measurement by the UE of the interference between the sensing operations by the UE and the cellular communication by the UE. The UE may receive a configuration for coexistence of the sensing operations by the UE and the cellular communication by the UE.

In the preceding embodiment, the assistance information may indicate frequencies with interference issues, an interference level, and a desired time domain multiplexing (TDM) pattern, and the configuration for coexistence of the sensing operations by the UE and the cellular communication by the UE may include one of: a frequency domain multiplexing (FDM) solution including handover of the UE to frequencies not interfering with the sensing operations by the UE; or a TDM solution configuring the UE with one of a discontinuous reception (DRX) operation for UE sensing during a DRX off duration, or a time domain resource reserved for the sensing operations by the UE.

In any of the preceding embodiments, a sensing signal configuration including waveform, cyclic shift, frequency tones, tone spacing, directionality, and time gap between successive sensing signal transmissions may be received by the UE. a sensing signal may be transmitted based on the received sensing signal configuration. The UE may receive one of a reflecting of the transmitted sensing signal or a sensing report.

In the preceding embodiment, the sensing signal configuration may employ reference signal (RS) sequences used for cellular communication for the sensing operations by the UE. The sensing signals for the sensing operations by the UE may be multiplexed with one or more of sensing signals for another UE or data signals. Sounding reference signals (SRSs) used for the sensing operations by the UE are transmitted on separate resources from SRSs for channel measurement. SRSs may be used for the sensing operations by the UE are transmitted with different power than SRSs for channel measurement.

In the preceding embodiment, SRSs used for the sensing operations by the UE may be transmitted on separate beams with a time gap therebetween. Antenna ports used for the sensing operations by the UE may be different from antenna ports for channel measurement and utilize a different cyclic shift. The UE may be configured to receive reflected sensing signals for a fraction of a symbol duration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 26A and 26B illustrate an example of sub-symbol level sensing signal configuration with comb-2 interlace according to various embodiments of this disclosure; and FIGS. 27A and 27B illustrate an example of sub-symbol level sensing signal configuration with comb-4 interlace according to various embodiments of this disclosure.

DETAILED DESCRIPTION

Figure 1:
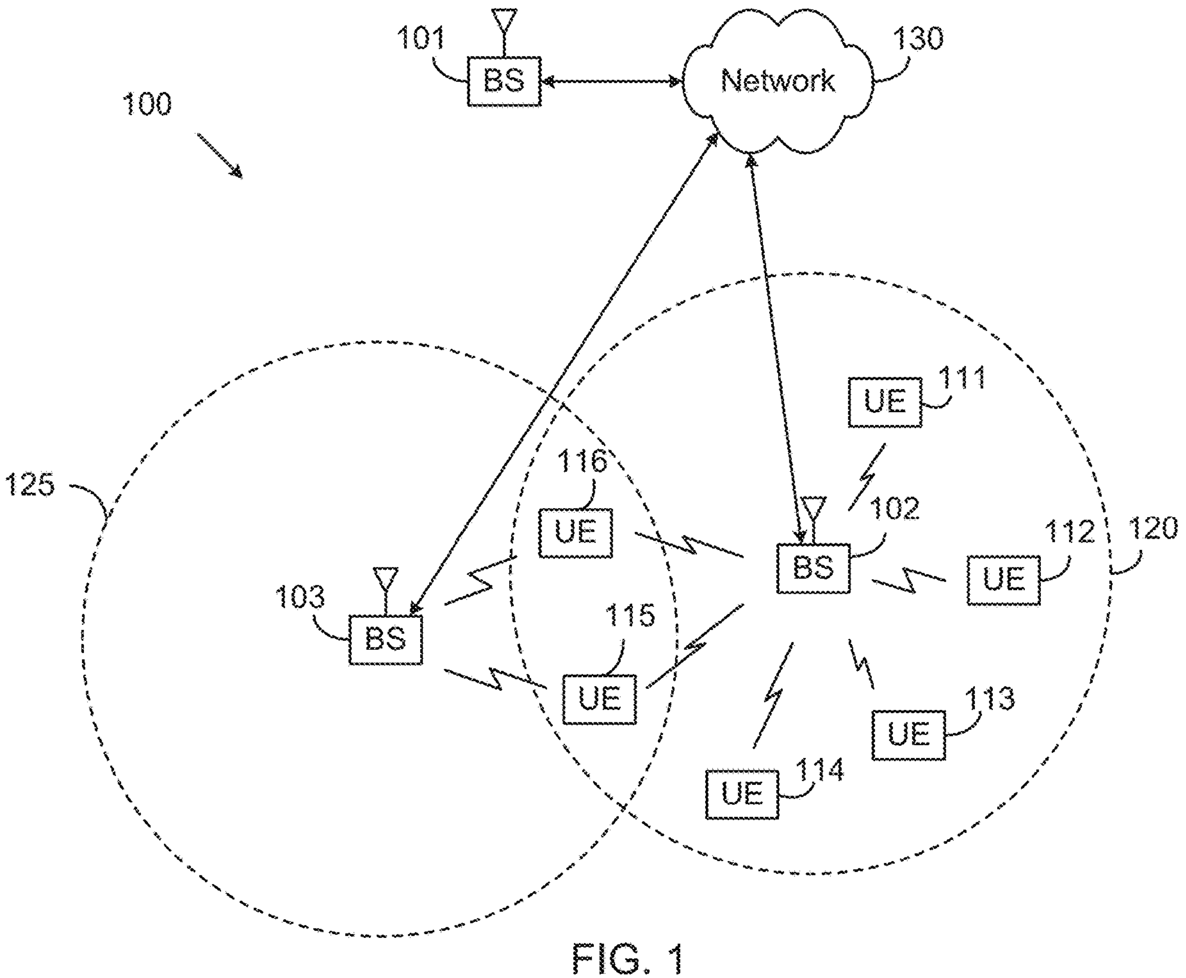
FIG. 1 illustrates an exemplary networked system utilizing reference signal temporal density configuration according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP TS 38.211 Rel-16 v16.4.0, "NR; Physical channels and modulation," December 2020.

[2] 3GPP TS 38.212 Rel-16 v16.4.0, "NR; Multiplexing and channel coding," December 2020.

[3] 3GPP TS 38.213 Rel-16 v16.4.0, "NR; Physical layer procedures for control," December 2020.

[4] 3GPP TS 38.214 Rel-16 v16.4.0, "NR; Physical layer procedures for data," December 2020.

[5] 3GPP TS 38.321 Rel-16 v16.3.0, "NR; Medium Access Control (MAC) protocol specification," December 2020.

[6] 3GPP TS 38.331 Rel-16 v16.3.0, "NR; Radio Resource Control (RRC) protocol specification," December 2020.

[7] 3GPP TS 38.300 Rel-16 v16.4.0, "NR; NR and NG-RAN Overall Description; Stage 2," December 2020.

The above-identified references are incorporated herein by reference.

Abbreviations

3GPP Third generation partnership project
ACK Acknowledgement
AP Antenna port
BCCH Broadcast control channel
BCH Broadcast channel
BD Blind decoding
BFR Beam failure recovery
BI Back-off indicator
BW Bandwidth
BLER Block error ratio
BL/CE Bandwidth limited, coverage enhanced
BWP Bandwidth Part
CA Carrier aggregation
CB Contention based
CBG Code block group
CBRA Contention based random access
CBS PUR Contention based shared PUR
CCE Control Channel Element
CD-SSB Cell-defining SSB
CE Coverage enhancement
CFRA Contention free random access
CFS PUR Contention free shared PUR
CG Configured grant
CGI Cell global identifier
CI Cancellation indication
CORESET Control Resource Set
CP Cyclic prefix
C-RNTI Cell RNTI
CRB Common resource block
CR-ID Contention resolution identity
CRC Cyclic Redundancy Check
CSI Channel State Information
CSI-RS Channel State Information Reference Signal
CS-G-RNRI Configured scheduling group RNTI
CS-RNTI Configured scheduling RNTI
CSS Common search space
DAI Downlink assignment index
DCI Downlink Control Information
DFI Downlink Feedback Information
DL Downlink
DMRS Demodulation Reference Signal
DTE Downlink transmission entity
EIRP Effective isotropic radiated power
eMTC enhanced machine type communication
EPRE Energy per resource element
FDD Frequency Division Duplexing
FDM Frequency division multiplexing
FDRA Frequency domain resource allocation
FR1 Frequency range 1
FR2 Frequency range 2
gNB gNodeB
GPS Global positioning system HARQ Hybrid automatic repeat request
HARQ-ACK Hybrid automatic repeat request acknowledgement
HARQ-NACK Hybrid automatic repeat request negative acknowledgement
HPN HARQ process number
ID Identity
IE Information element
IIoT Industrial internet of things
IoT Internet of Things
JCS Joint Communication and Sensing
KPI Key performance indicator
LBT Listen before talk
LNA Low-noise amplifier
LRR Link recovery request
LSB Least significant bit
LTE Long Term Evolution
MAC Medium access control
MAC-CE MAC control element
MCG Master cell group
MCS Modulation and coding scheme
MIB Master Information Block
MIMO Multiple input multiple output
MPE maximum permissible exposure
MTC Machine type communication
mMTC massive machine type communication
MSB Most significant bit
NACK Negative acknowledgment
NDI New data indicator
NPN Non-public network
NR New Radio
NR-L NR Light/NR Lite
NR-U NR unlicensed
NTN Non-terrestrial network
NW Network
OSI Other system information
PA Power amplifier
PI Preemption indication
PBCH Physical broadcast channel
PCell Primary cell
PRACH Physical Random Access Channel
PDCCH Physical Downlink Control Channel
PDSCH Physical Downlink Shared Channel
PUCCH Physical Uplink Control Channel
PUSCH Physical Uplink Shared Channel
PMI Precoder matrix indicator
P-MPR Power Management Maximum Power Reduction
PO PUSCH occasion
PSCell Primary secondary cell
PSS Primary synchronization signal
P-RNTI Paging RNTI
PRG Precoding resource block group
PRS Positioning reference signal
PTRS Phase tracking reference signal
PUR Pre-configured uplink resource
QCL Quasi co-located/Quasi co-location
RA Random access
RACH Random access channel
RAPID Random access preamble identity
RAR Random access response
RA-RNTI Random access RNTI
RAN Radio Access Network
RAT Radio access technology
RB Resource Block
RBG Resource Block group
RF Radio Frequency
RLF Radio link failure RLM Radio link monitoring
RMSI Remaining minimum system information
RNTI Radio Network Temporary Identifier
RO RACH occasion
RRC Radio Resource Control
RS Reference Signal
RSRP Reference signal received power
RV Redundancy version
Rx Receive/Receiving
SAR Specific absorption rate
SCG Secondary cell group
SFI Slot format indication
SFN System frame number
SI System Information
SIC Successive Interference Cancellation
SI-RNTI System Information RNTI
SIB System Information Block
SINR Signal to Interference and Noise Ratio
SCS Sub-carrier spacing
SMPTx Simultaneous multi-panel transmission
SMPTRx Simultaneous multi-panel transmission and reception
SpCell Special cell
SPS Semi-persistent scheduling
SR Scheduling Request
SRI SRS resource indicator
SRS Sounding reference signal
SS Synchronization signal
SSB SS/PBCH block
SSS Secondary synchronization signal
STxMP Simultaneous transmission by multiple panels
STRxMP Simultaneous transmission and reception by multiple panels
TA
TB
TB S
TCI
Timing advance
Transport Block
Transport Block size
Transmission Configuration Indication
TC-RNTI Temporary cell RNTI
TDD Time Division Duplexing
TDM Time division multiplexing
TDRA Time domain resource allocation
TPC Transmit Power Control
TRP Total radiated power
Tx Transmit/Transmitting
UCI Uplink Control Information
UE User Equipment
UL Uplink
UL-SCH Uplink shared channel
URLLC Ultra reliable and low latency communication
UTE Uplink transmission entity
V2X Vehicle to anything
VoIP Voice over Internet Protocol (IP)
XR eXtended reality The present disclosure relates to beyond 5G or 6G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 6G, and so on), IEEE standards (such as 802.11/15/16), and so forth.

This disclosure pertains to joint communication and radar sensing, wherein a UE is able to perform downlink/uplink/ sidelink communication and also perform radar sensing by "sensing"/detecting environmental objects and their physical characteristics such as location/range, velocity/speed, elevation, angle, and so on. Radar sensing is achieved by sending a suitable sounding waveform and receiving and analyzing reflections or echoes of the sounding waveform. Such radar sensing operation can be used for applications and use-case such as proximity sensing, liveness detection, gesture control, face recognition, room/environment sensing, motion/presence detection, depth sensing, and so on, for various UE form factors. For some larger UE form factors, such as (driver-less) vehicles, trains, drones and so on, radar sensing can be additionally used for speed/cruise control, lane/elevation change, rear/blind spot view, parking assistance, and so on. Such radar sensing operation can be performed in various frequency bands, including mmWave/FR2 bands. In addition, with THz spectrum, ultra-high resolution sensing, such as sub-cm level resolution, and sensitive Doppler detection, such as micro-Doppler detection, can be achieved with very large bandwidth allocation, for example, on the order of several GHz or more.

Current implementations can support individual operation of communication and sensing, wherein the UE is equipped with separate modules, in terms of baseband processing units and/or RF chain and antenna arrays, for communication procedures and radar procedures. The separate communication and sensing architectures require repetitive implementation that increases UE complexity. In addition, since the two modules are designed separately, there is little/no coordination between the modules, so time/frequency/sequence/spatial resources are not efficiently used by the two modules, which in some cases can even lead to (self-) interference between the two modules of a same UE. In addition, the radar sensing operation of the UE can be based on pure implementation-based methods and without any unified standards support, which can cause (significant) inter-UE issues, or may not be fully compatible with cellular systems. Furthermore, separate design of the two modules makes it difficult to use measurement or information acquired by one module to assist the other module. For example, the communication module may be unaware of a potential beam blockage due to a nearby object, although the sensing module may have already detected the object.

There is a need to develop a unified standard for support of joint communication and sensing to reduce the UE implementation complexity and enable coexistence of the two modules. There is another need to ensure time/frequency/sequence/spatial resources are efficiently used across communication and sensing modules of a same UE, as well as among different UEs performing these two operations, to reduce/avoid (self-)interference. There is a further need to design the two operations in such a way to provide assistance to each other by exchanging measurement results and acquired information, so that both procedures can operate more robustly and effectively.

The present disclosure provides designs for the support of joint communication and radar sensing. In particular, this disclosure is regarding sensing resource configuration and coexistence configuration for joint communication and sensing in user equipments.

Embodiments of the disclosure for supporting joint communication and radar sensing in wireless communication systems are summarized in the following and are fully elaborated further below.

Method and apparatus for time and frequency domain resource configuration in cellular system for sensing operation.

Method and apparatus for coexistence handling for joint communication and sensing in cellular system.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 2:
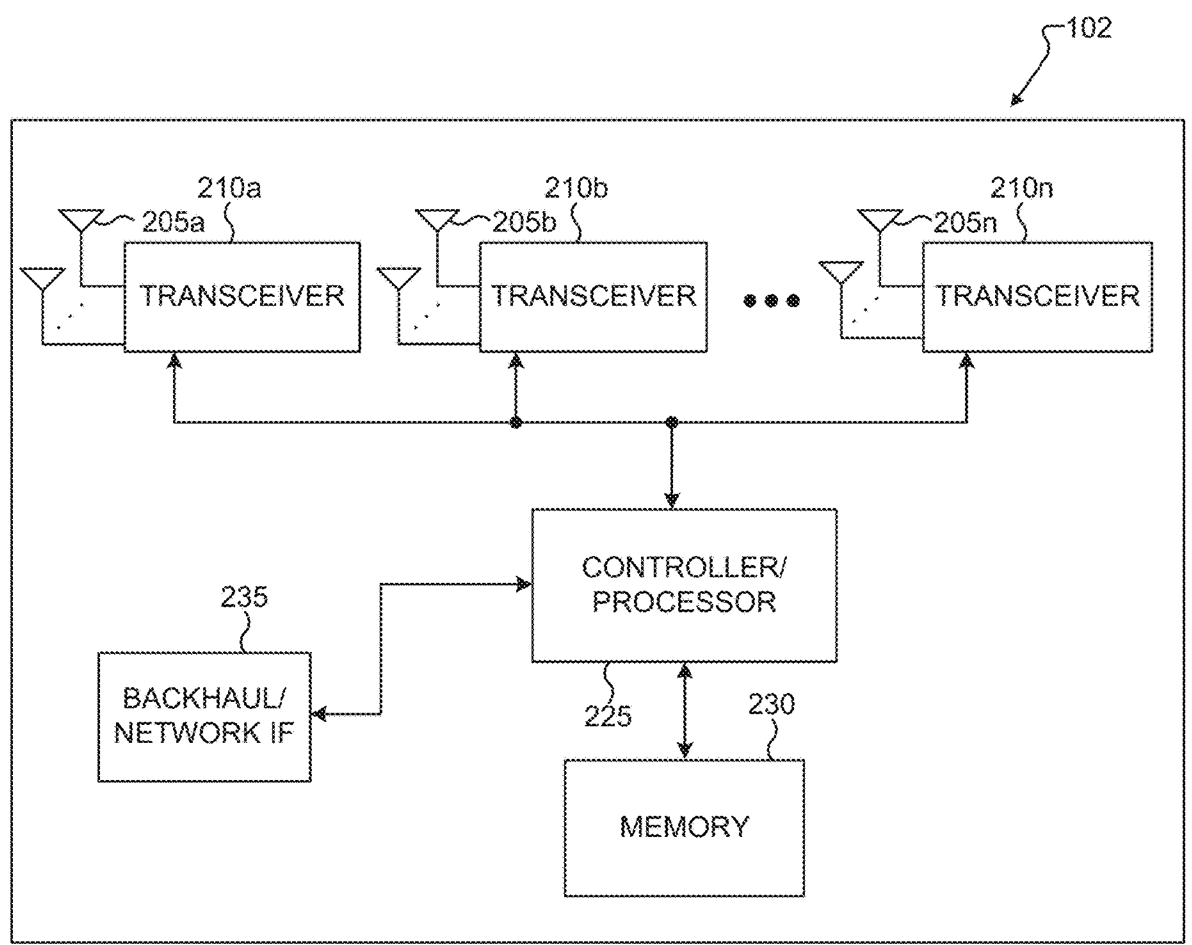
FIG. 2 illustrates an exemplary base station (BS) utilizing reference signal temporal density configuration according to various embodiments of this disclosure.
Figure 3:
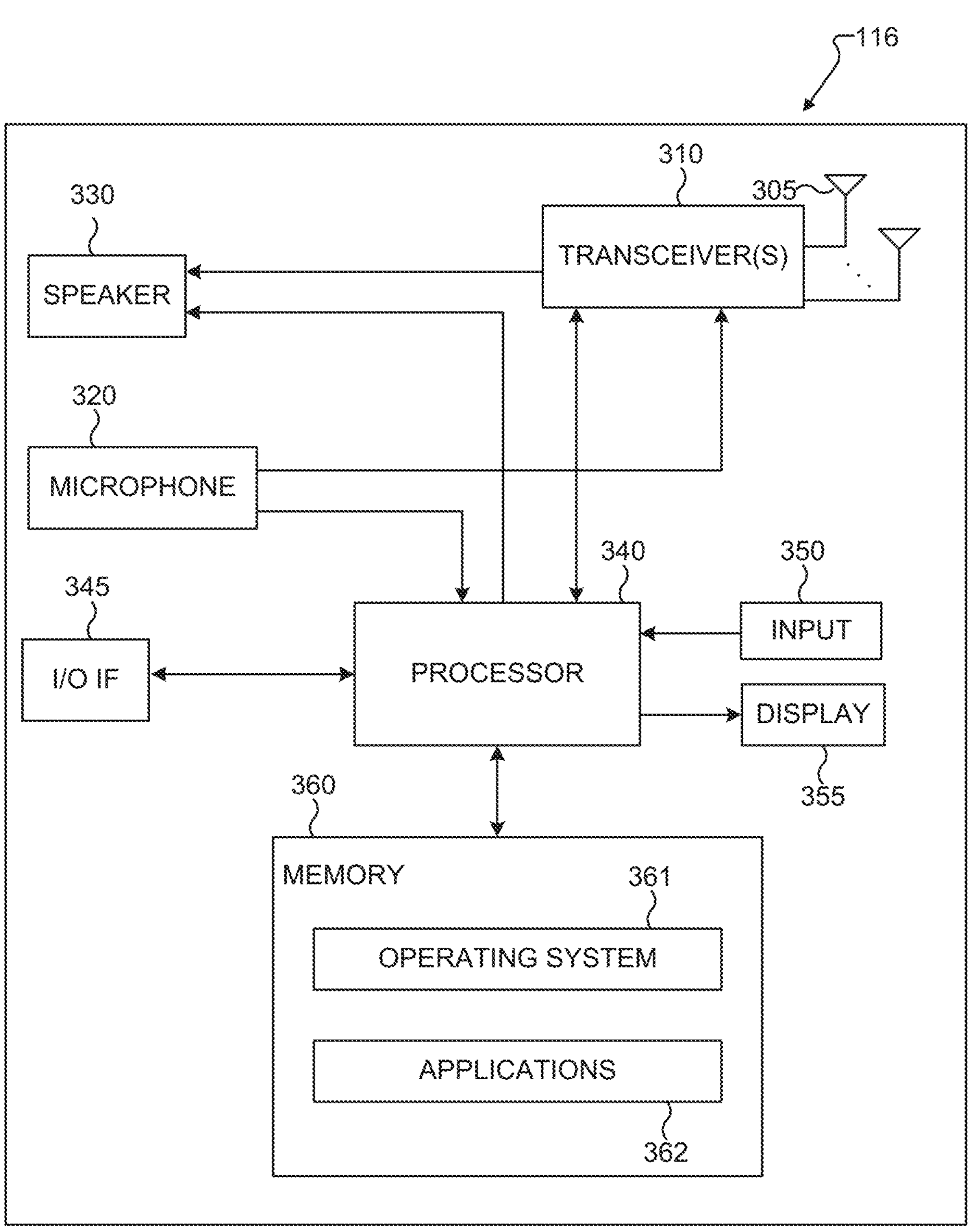
FIG. 3 illustrates an exemplary electronic device for communicating in the networked computing system utilizing reference signal temporal density configuration according to various embodiments of this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an exemplary networked system utilizing resource configuration and coexistence handling according to various embodiments of this disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, to support sensing resource configuration and coexistence configuration for joint communication and sensing in user equipment. In certain embodiments, and one or more of the gNBs 101-103 includes circuitry, programing, or a combination thereof, to support sensing resource configuration and coexistence configuration for joint communication and sensing in user equipment.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an exemplary base station (BS) utilizing resource configuration and coexistence handling according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support sensing resource configuration and coexistence configuration for joint communication and sensing in user equipment. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an exemplary electronic device for communicating in the networked computing system utilizing resource configuration and coexistence handling according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes to support sensing resource configuration and coexistence configuration for joint communication and sensing in user equipment. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5A, 5B:
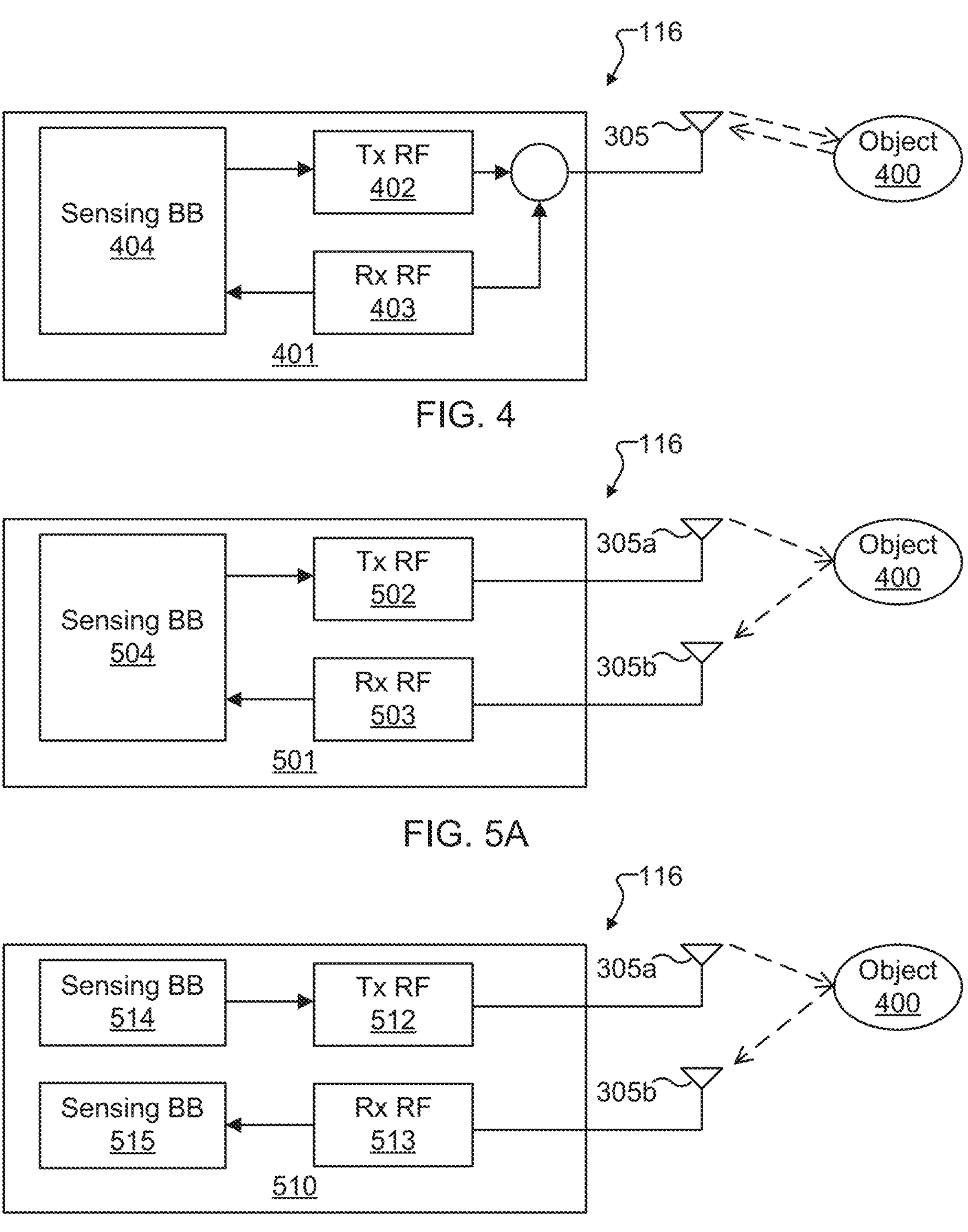
FIG. 4 illustrates a high level diagram of a monostatic radar according to various embodiments of this disclosure.
FIGS. 5A and 5B illustrate high level diagrams of a bi-static radar according to various embodiments of this disclosure.

FIG. 4 illustrates a high level diagram of a monostatic radar according to various embodiments of this disclosure. The embodiment of FIG. 4 is for illustration only. Other embodiments of the system 401 could be used without departing from the scope of this disclosure.

FIG. 4 illustrates a monostatic radar system in which the transmission of radar waveform and the reception of reflected waveform alternates and is performed within a device 116. Monostatic radar system 401 includes transmit RF processing 402 and receive RF processing 403 coupled to the same antenna 305, and respectively receiving output from and providing input to a single baseband (BB) processing circuit 404. Signals provided by transmit RF processing 402 are transmitted using the antenna 305, reflect off the object 400 and are received by antenna 305, and are filtered and otherwise pre-processed by receive RF processing 403 for use by sensing baseband processing circuit 404 in determining distance, velocity, acceleration, and/or direction of the object 400. Monostatic radar is suitable for short pulse sensing waveform. To avoid self-interference, the radio needs to turn around from transmission to reception before the reflected signal arrives.

FIGS. 5A and 5B illustrate high level diagrams of a bi-static radar according to various embodiments of this disclosure. The embodiments of FIGS. 5A-5B are for illustration only. Other embodiments of the systems 501, 510 could be used without departing from the scope of this disclosure.

FIGS. 5A and 5B illustrate bi-static radar systems in which the transmission of radar waveform and the reception of reflected waveform can be performed concurrently within a device 116. In each of FIGS. 5A and 5B, radar system 501, 510 includes respective transmit RF processing 502, 512 and respective receive RF processing 503, 513 coupled to different antenna 305*a*, 305*b*. In both FIG. 5A and FIG. 5B, signals provided by transmit RF processing 502, 512 are transmitted using one antenna 305*a*, reflect off the object 400 and are received by another antenna 305*b*, and are filtered and otherwise pre-processed by receive RF processing 503, 513. However, transmit RF processing 502 and receive RF processing 503 in FIG. 5A still respectively receive output from and provide input to a single baseband processing circuit 504. By contrast, transmit RF processing 512 receives output from one baseband processing circuit 514 in FIG. 5B, and receive RF processing 513 provides input to a separate baseband processing circuit 515.

Bi-static radar is suitable for continuous transmission of sensing waveform. Both transmission and reception modules can be placed within a device as shown in FIGS. 5A and 5B. In these cases, a separation between transmission and reception antennas is desired. In other embodiments of a bi-static radar system, transmission and reception modules are placed in different devices. A separation between transmission and reception antennas is naturally achieved.

Figures 6, 7:
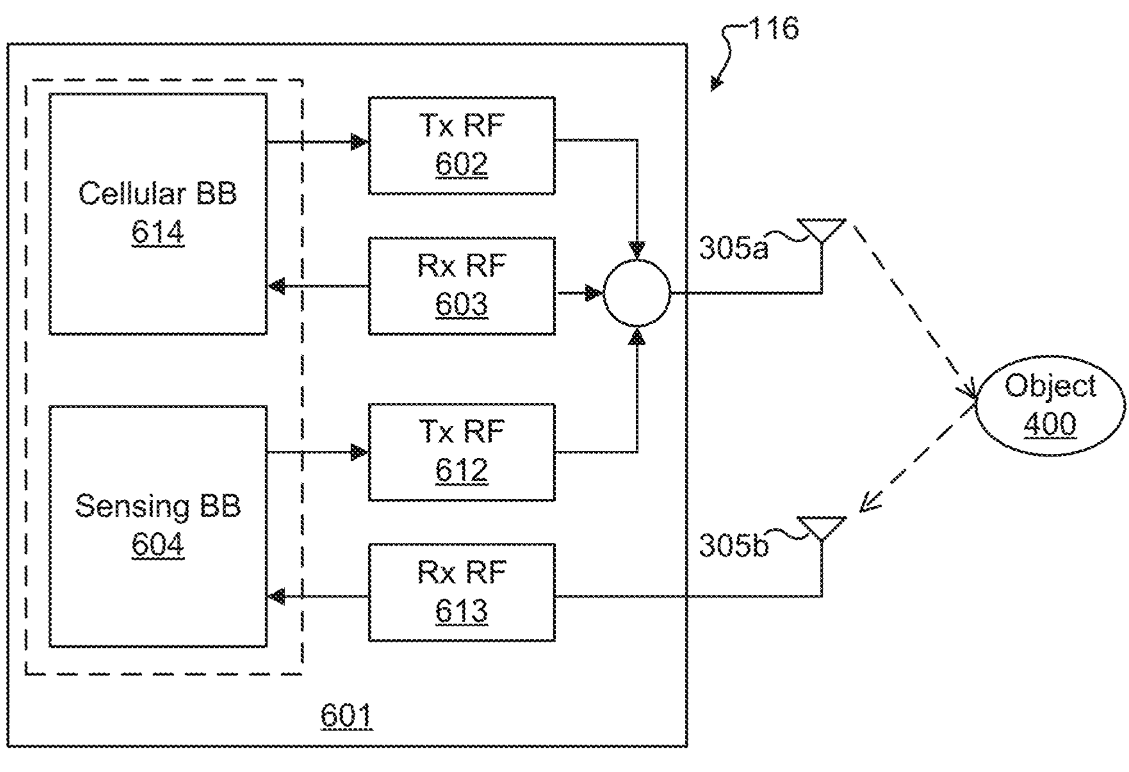
FIG. 6 illustrates a high level diagram of a JCS implementation according to various embodiments of this disclosure.
FIG. 7 illustrates a high level diagram of JCS signal flow according to various embodiments of this disclosure.

FIG. 6 illustrates a high level diagram of a joint communication and sensing (JCS) implementation according to various embodiments of this disclosure. The embodiment of FIG. 6 is for illustration only. Other embodiments of the system 601 could be used without departing from the scope of this disclosure.

FIG. 6 illustrates a possible JCS UE implementation for UEs having cellular communication modules. JCS system 601 includes transmit RF processing 602 and receive RF processing 603 coupled to one antenna 305*a*, and respectively receiving output from and providing input to a cellular baseband processing circuit 614. JCS system 601 also includes transmit RF processing 612 coupled to the first antenna 305*a*, and receive RF processing 603 coupled to a second antenna 305*b*. Transmit RF processing 612 and receive RF processing 603 respectively receive output from and provide input to a single sensing baseband processing circuit 604.

The cellular baseband processing circuit 614 and the sensing baseband processing circuit 604 may be discrete modules communicating with each other, or may be (as depicted) logically separate but integrated into a single module. In this example, the transmission of sensing waveform and the reception of reflected sensing waveform can be concurrent while transmission/reception for communication are switched off, enabling bi-static radar operation. Also, concurrent transmission for communication and reception for sensing waveform are possible. In that case, the sensing could be monostatic (the UE both transmits and receives sensing waveforms) or bi-static (another UE or device transmits the sensing waveform). Concurrent reception for communication and reception for sensing are also possible. SIC may be applied to remove the interference from sensing signal for the reception of communication signal or vice versa.

FIG. 7 illustrates a high level diagram of JCS signal flow according to various embodiments of this disclosure. The embodiment of FIG. 7 is for illustration only. Other embodiments of signaling could be used without departing from the scope of this disclosure.

FIG. 7 is an example procedure for UE 116 and NW 710 (e.g., BS 102) to exchange messages for sensing configuration. In 701, a UE 116 sends UE Capability Information (e.g., RRC message) to NW 710, informing the NW 710 of the UE's JCS capability including hardware (HW) capability, SIC capability, etc. In 702, the UE 116 sends a sensing configuration request message including sensing application type, range, and sensing periodicity, etc. In 703, the NW 710 configures sensing operations to UE 116 including waveform, resource, sensing transmission power, periodicity, etc.

Figure 8:
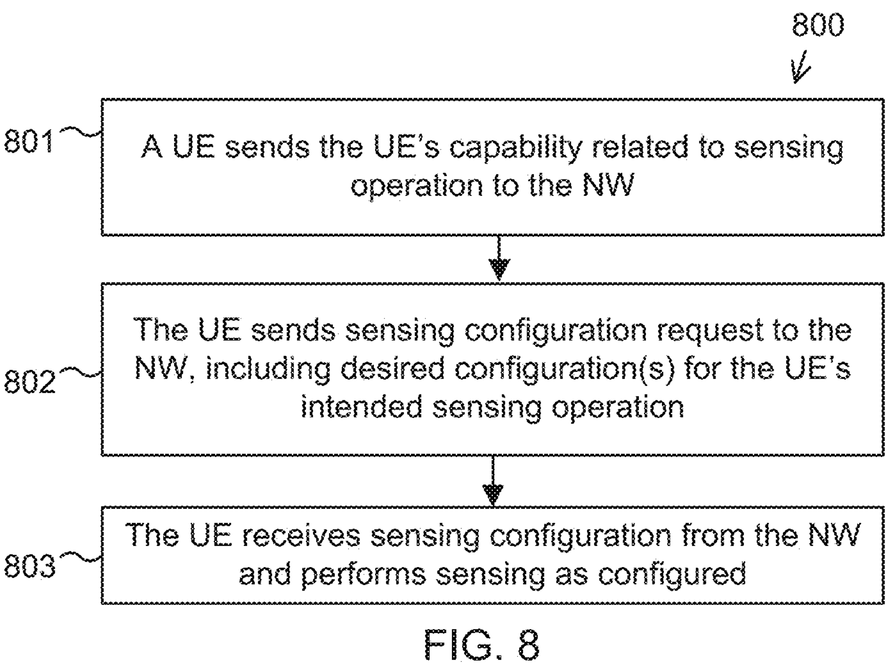
FIG. 8 illustrates a high level flowchart for UE operation of sensing configuration according to various embodiments of this disclosure.

FIG. 8 illustrates a high level flowchart for UE operation of sensing configuration according to various embodiments of this disclosure. The embodiment of FIG. 8 is for illustration only. Other embodiments of the process 800 could be used without departing from the scope of this disclosure.

FIG. 8 is an example of a method 800 for sensing configuration from a UE perspective consistent with FIG. 7. At 801, the UE sends the UE's capability (e.g., in an RRC message) related to sensing operations to the NW, informing the NW of the UE's JCS capability including hardware capability, SIC capability, etc. In 802, the UE sends a sensing configuration request message including desired configuration(s) (sensing application type, range, and sensing periodicity, etc.). In 803, the UE receives sensing configurations from the NW, and then performs sensing as configured.

Figure 9:
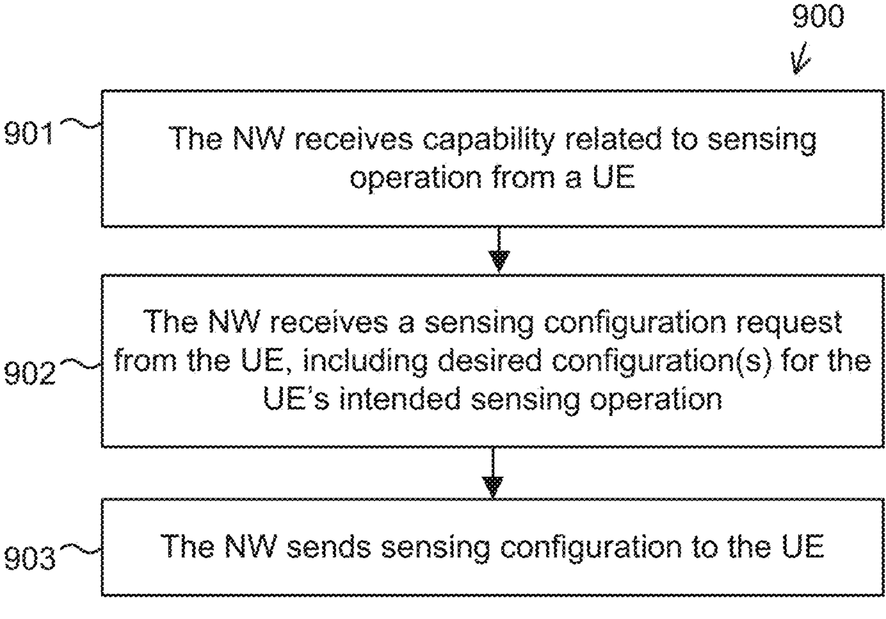
FIG. 9 illustrates a high level flowchart for NW operation of sensing configuration according to various embodiments of this disclosure.

FIG. 9 illustrates a high level flowchart for NW operation of sensing configuration according to various embodiments of this disclosure. The embodiment of FIG. 9 is for illustration only. Other embodiments of the process 900 could be used without departing from the scope of this disclosure.

FIG. 9 is an example of a method 900 for sensing configuration from a NW perspective, consistent with FIG. 7. In 901, the NW receives the UE's capability (e.g., in an RRC message) related to sensing operations. In 902, the NW receives a sensing configuration request message including desired configuration(s) (sensing application type, range, and sensing periodicity, etc.) for the UE's intended sensing operation. In 903, the NW sends sensing configurations from the NW, and then performs sensing as configured.

In one embodiment, the UE can send its sensing capability to NW. TABLE 1 is an example list of possible information elements (IEs) for UE sensing capability indication to NW:

TABLE 1

Possible IEs for UE sensing capability indication msg

| | Description |
|---|---|
| BB coordination | Coordination between cellular and sensing modem |
| Sensing power class | Max Tx power for sensing |
| Sensing BW, supported bands, in-band sensing capability, etc. | Max supported sensing BW; list of supported bands for sensing; indication on whether in-band sensing is supported or not |
| RF/Antenna | Shared or separate between cellular and sensing<br>Shared or separate between sensing Tx and sensing Rx (monostatic vs. bistatic) |
| Self-interference cancellation (full-duplex capability) | Cancellation of cellular Tx signal from sensing Rx<br>Cancellation of sensing Tx signal from cellular Rx |
| SIC | SIC capability for simultaneous reception of cellular and sensing signals |
| Waveform | Supported types of sensing waveform |

In one example, the UE can indicate the UE's baseband coordination capability between cellular and sensing modems. Possible indication of values could include {tight coordination, loose coordination, no coordination} as an example. Tight coordination may indicate that the cellular baseband has a full control over sensing baseband or sensing capability is implemented as a function of cellular baseband within an integrated chipset. Loose coordination may indicate that the cellular baseband and sensing baseband can communication on related parameters but one does not have a control over the other. No coordination may indicate that the two baseband functions cannot communicate with each other.

In another example, the UE can indicate the UE's sensing power class to the NW. As an example, the UE can indicate that the UE's sensing power class is the same with the UE's power class for communication or a specific power value, e.g., in decibel-milliwatts (dBm), to the NW, if different.

In yet another example, the UE can indicate the UE's supported sensing bandwidth, e.g., in mega-Hertz (MHz) or giga-Hertz (GHz), so that the NW does not configure a UE for sensing bandwidth exceeding the UE's capability. The UE can also indicate the list of bands that the UE supports for sensing operation. It can be indicated, for instance, in terms of NR band identifier (ID). The UE can also indicate whether in-band sensing can be supported, i.e., operation within a band configured for communication. If in-band sensing is not supported, then by default, the NW can assume that only out-of-band sensing can be supported by the UE.

In yet another example, the UE can indicate whether RF/antennas are shared or separate between cellular and sensing functions. The UE can also indicate whether RF/antennas are shared or separate between sensing transmission and reception. Based on this information, the NW can configure a correct mode of sensing operation, e.g., mono-static or bi-static, and resources for the UE.

In yet another example, the UE can indicate whether the UE has self-interference cancellation capability, e.g., cancellation of cellular transmission signal from sensing reception signal or cancellation of sensing transmission signal from cellular reception signal, etc. The UE can also indicate successive interference cancellation capability between a signal received for communication and a signal received for sensing. The UE can also indicate supported types of sensing waveforms as a part of UE capability indication.

Figure 10:
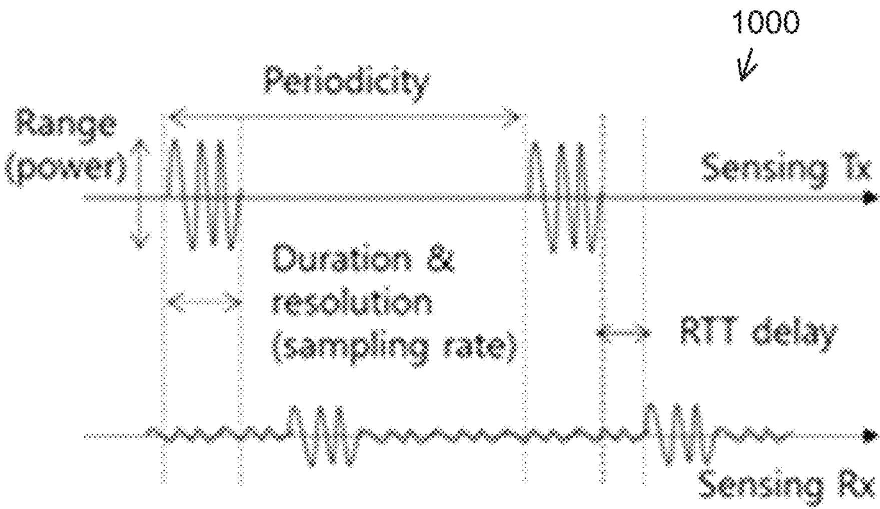
FIG. 10 illustrates an example timing diagram for monostatic sensing according to various embodiments of this disclosure.

FIG. 10 illustrates an example timing diagram for mono-static sensing according to various embodiments of this disclosure. The embodiment of FIG. 10 is for illustration only. Other embodiments of the timing 1000 could be used without departing from the scope of this disclosure.

FIG. 10 is an example sensing timing diagram for mono-static sensing, i.e., transmission of sensing waveform and the reception of reflected signal occur one at a time due to shared RF/antennas. In this case, the sensing transmission signal duration $T_{sensing\ Tx}$ should be less than or equal to $T_{RTT}-T_{T\_Turnaround}$, where $T_{RTT}$ is the expected round-trip-time for sensing transmission signal bounce-back considering target sensing application and range and $T_{Turnaround}$ is sensing RF transmission-to-reception turnaround time. If bi-static sensing is supported by UE, no such restriction is required.

In one embodiment, UE sends sensing configuration request message including sensing application type, range, and sensing periodicity, etc. Table. 2 is an example list of possible IEs for UE sensing configuration request message to NW:

TABLE 2

Possible IE for UE sensing configuration request msg

| | Description |
|---|---|
| Application type | Automotive, face/gesture recognition, etc. |
| Range | Target sensing range, e.g., short/mid/long range sensing |
| Periodicity | Continuous or periodic sensing w/interval |
| Resolution | Required resolution |
| Directional sensing | Beam sweeping for directional sensing, number of beams, antenna/beamforming gain, 3-dB beam width |
| Sensing direction | Time duration of sensing Tx signal and reception duration |

In one example, the UE can indicate the UE's sensing application type, such as automotive, face/gesture recognition, etc., as the sensing resource configuration by NW may depend on the requested sensing application type. In another embodiment, the sensing application type may not be directly indicated to the NW but may be indirectly indicated via attributes of required sensing resource configuration.

In another example, the UE can indicate the desired range of sensing operation. As an example, long range sensing may be requested for automotive application or similarly short range sensing may be requested for face/gesture recognition application. The requested range values can be {short, mid, long} with predefined range values for each element. The requested range values can be in terms of meters. The configured sensing transmission power level by NW may depend on this indication.

In yet another example, the UE can indicate the desired periodicity of the sensing, i.e., continuous or periodic sensing with a certain interval. The configured time-domain sensing resource by NW may depend on this indication.

In yet another example, the UE can indicate the desired resolution of the sensing, i.e., fine granularity for sensing. The configured sensing bandwidth by NW may depend on this indication.

In yet another example, the UE can indicate whether directional sensing is requested. In this case, the UE can indicate the desired beamforming gain, 3 decibel (dB) beam width, and the number of beams for sweeping. The UE can obtain object sensing results towards certain directions which can enable various use cases requiring directional sensing information.

In yet another example, the UE can indicate time duration of sensing transmission signal and reception duration. In the case of bi-static sensing, the transmission and reception can be continuous. In the case of monostatic sensing, the transmission duration can be dependent on sensing application type and/or target sensing range, etc.

In another embodiment, the UE can indicate an index from a set of predefined sensing modes (e.g., TABLE 3 below). Each mode is associated with attributes that can support a certain use case including transmission power, bandwidth, range, periodicity, resolution, directional sensing, sensing duration, etc.

TABLE 3

Example of predefined sensing mode

| Mode | Tx Power | BW | (Intended use case) |
|---|---|---|---|
| 1 | 20 dBm | 10 MHz | Automotive |
| 2 | −1 dBm | 100 MHz | Face recognition |
| 3 | 0 dBm | 40 MHz | Gesture recognition |
| 4 | 10 dBm | 20 MHz | Indoor presence detection |
| . . . | . . . | . . . | . . . |

In one embodiment, the NW configures a UE with sensing resources and attributes and the UE performs sensing according to the configuration. TABLE 4 is an example list of possible IEs for NW sensing configuration message:

TABLE 4

Possible IE for NW sensing configuration msg

| | Description |
|---|---|
| Max Tx power | Max sensing Tx power, i.e., $P_{CMAX}$ |
| Target reception power | For sensing Tx power control based on the pathloss of the bounced back sensing Tx signal |
| Waveform | Sensing Tx waveform |
| Periodicity | Sensing periodicity interval |
| Sensing duration | Sensing Tx time duration and Rx time duration |
| Directional sensing | Allowed number of beams for sensing sweeping, allowed beamforming/antenna gain, 3-dB beam width, etc. |
| Resource | Sensing time/frequency resource configuration including signal BW and carrier frequency |

The IEs may include maximum transmission power for sensing waveform transmission, target reception power of the reflected sensing waveform for power control, sensing waveform and transmission periodicity, sensing duration, attributes for directional sensing including allowed number of beams and beam width, and sensing resource in time, frequency, and spatial domain, etc.

Figures 11, 12:
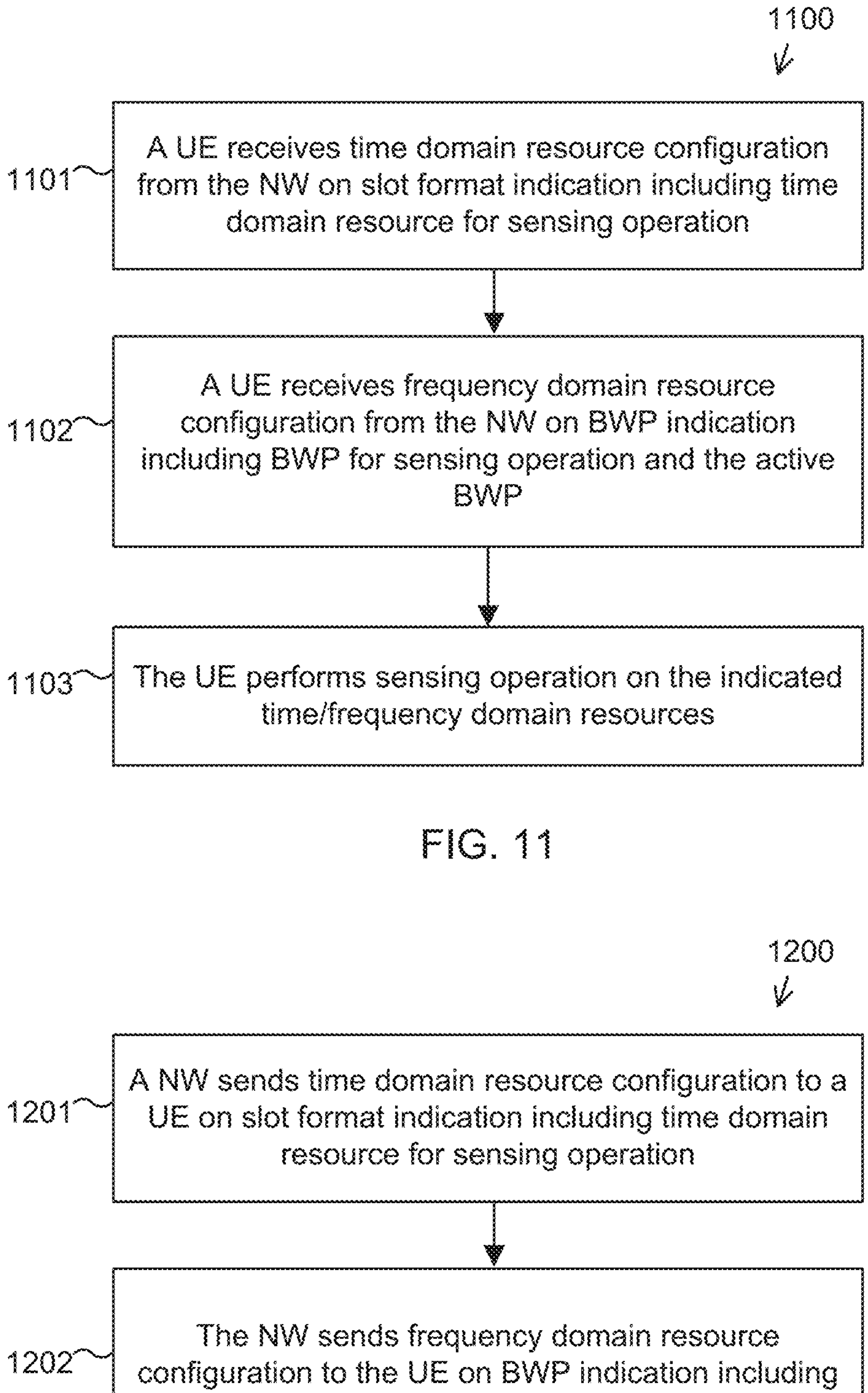
FIG. 11 illustrates a high level flowchart for UE operation of sensing resource configuration according to various embodiments of this disclosure.
FIG. 12 illustrates a high level flowchart for NW operation of sensing resource configuration according to various embodiments of this disclosure.

FIG. 11 illustrates a high level flowchart for UE operation of sensing resource configuration according to various embodiments of this disclosure. The embodiment of FIG. 11 is for illustration only. Other embodiments of the process 1100 could be used without departing from the scope of this disclosure.

FIG. 11 is an example of a method 1100 for sensing resource configuration from a UE perspective, consistent with other embodiments disclosed herein. In 1101, a UE receives time domain resource configuration from the NW on slot format indication. The slot format indication preserves the purpose of indicating duplex direction for communication, including downlink (D), uplink (U), and flexible (F) slot or symbol types. In addition, in one embodiment, the slot format indication includes indication of slot/symbol for sensing (S) purpose, during which the UE can perform sensing operations. In 1102, the UE receives frequency domain resource configuration, i.e., BWP. In one embodiment, the BWP configuration can be common for both communication and sensing, i.e., one set of BWPs are configured for the UE for both communication and sensing. In one embodiment, BWP activation may be common, i.e., not distinguished, or separately activated for communication and sensing (i.e., as distinct from separate indication of active BWP for communication and sensing). In another embodiment, the UE may be configured with a separate set of BWPs for communication and a separate set of BWPs for sensing, which may contain common elements with the set configured for communication. The BWP activation can be common or separate as described earlier. Once the UE is configured with time and frequency domain resources for sensing, at 1103, the UE performs sensing operation on the indicated resource.

FIG. 12 illustrates a high level flowchart for NW operation of sensing resource configuration according to various embodiments of this disclosure. The embodiment of FIG. 12 is for illustration only. Other embodiments of the process 1200 could be used without departing from the scope of this disclosure.

FIG. 12 is an example of a method 1200 for sensing resource configuration from a NW perspective, consistent with other embodiments disclosed herein. In 1201, a NW sends time domain resource configuration to a UE on slot format indication. The slot format indication preserves the purpose of indicating duplex direction for communication, including downlink (D), uplink (U), and flexible (F) slot or symbol types. In addition, in one embodiment, the slot format indication includes indication of slot/symbol for sensing (S) purpose, during which the UE can perform sensing operations. In 1201, the NW sends frequency domain resource configuration, i.e., BWP, to the UE. In one embodiment, the BWP configuration can be common for both communication and sensing, i.e., one set of BWPs are configured for the UE for both communication and sensing. In one embodiment, BWP activation may be common, i.e., not distinguished, or separately activated for communication and sensing (i.e., as distinct from separate indication of active BWP for communication and sensing). In another embodiment, the UE may be configured with a separate set of BWPs for communication and a separate set of BWPs for sensing, which may contain common elements with the set configured for communication. The BWP activation can be common or separate as described earlier.

Figure 13:
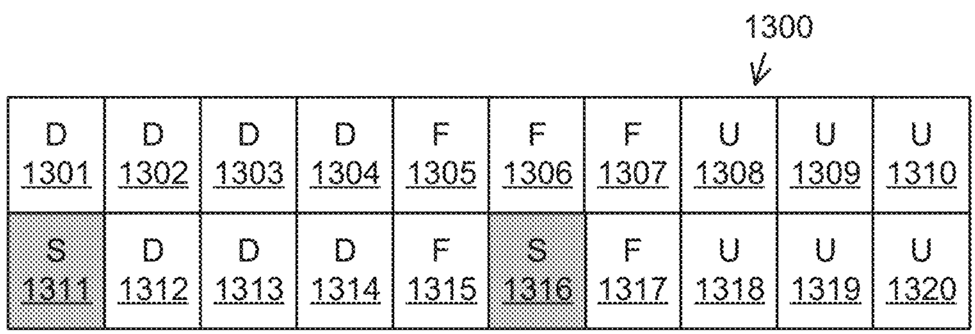
FIG. 13 illustrates a high level diagram of JCS TDM resource configuration using sensing resource type "S" according to various embodiments of this disclosure.

FIG. 13 illustrates a high level diagram of JCS TDM resource configuration using sensing resource type "S" according to various embodiments of this disclosure. The embodiment of FIG. 13 is for illustration only. Other embodiments of the configuration 1300 could be used without departing from the scope of this disclosure.

FIG. 13 is an example of time domain resource configuration for joint communication and sensing. In particular, a new sensing type resource "S" is introduced in the slot format indication such that the UE can multiplex between communication (D/U/F) slots and sensing slots. The top row in FIG. 13 (symbols 1301, 1302, 1303, 1304, 1305, 1306, 1307, 1308, 1309, 1310) illustrates TDD for communication (only), consisting of D/U/F symbol types. The bottom row in FIG. 13 (symbols 1311, 1312, 1313, 1314, 1315, 1316, 1317, 1318, 1319, 1320) illustrates TDD for JCS with sensing periodicity of 5 slots (or symbols) using the new sensing symbol type "S." In another embodiment, the flexible type (F) resource can be also used for sensing purposes. As an example, the NW may indicate a UE via L1, L2, MAC-CE, or any higher layer signaling to indicate that a certain F type resources can be also used for sensing purposes. In one embodiment, the UE is not required to monitor cellular DL signals during S type resources. In another embodiment, there can be a set of time slots in which dynamic triggering of sensing is allowed. If dynamically triggered time resources for sensing overlap with resources for communication, the UE may override a slot format indication that the resources are for data transmission/reception and perform a sensing operation using the resources. In yet another embodiment, depending on the UE full-duplex capability, the UE can be configured with multiple sets of slot format indications, including a separate pattern for DL data transmission, a separate pattern for UL data reception, and a separate pattern for sensing operation.

Figure 14:
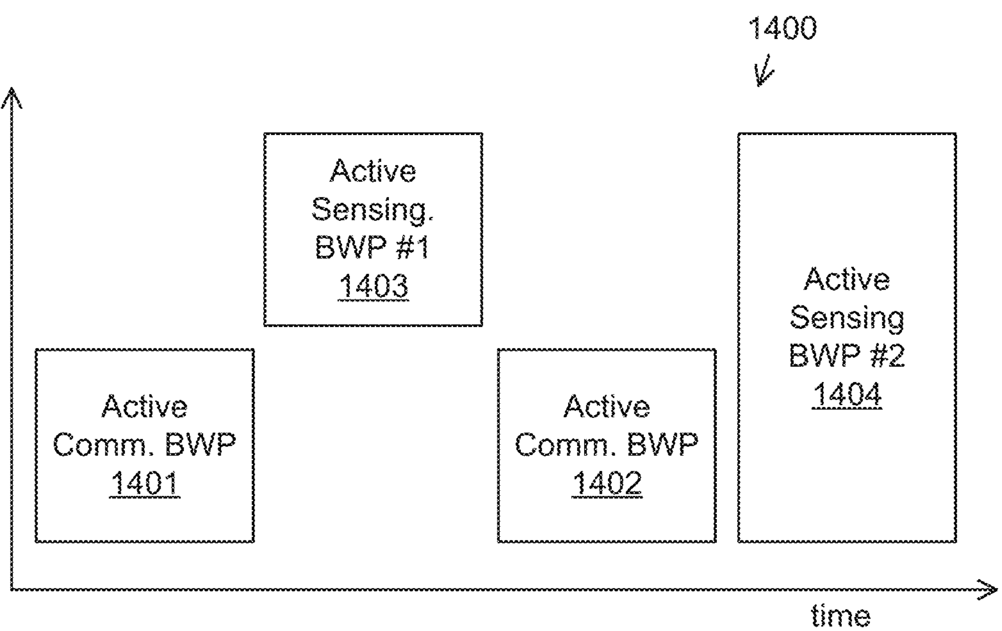
FIG. 14 illustrates a high level diagram of JCS BWP switching for JCS with multiple sensing applications according to various embodiments of this disclosure.

FIG. 14 illustrates a high level diagram of JCS BWP switching for JCS with multiple sensing applications according to various embodiments of this disclosure. The embodiment of FIG. 14 is for illustration only. Other embodiments of the configuration 1400 could be used without departing from the scope of this disclosure.

FIG. 14 is an example of BWP switching for joint communication and sensing operation. Frequency-domain resource for sensing can be configured using BWPs configured for cellular system. In one embodiment, there can be a shared common set of BWPs configured for both communication and sensing. In another embodiment, shown in FIG. 14, the BWP configuration can be separate for communication 1401, 1402 and sensing 1403, 1404. The activated BWP for sensing can be different or the same from that for communication. One or multiple sensing BWPs can be activated even for sensing operation. Multiple active BWPs may be for different sensing applications, and may be active separately in the time domain as illustrated in FIG. 14 or simultaneously depending on the UE RF/antenna capability. Sensing BWP(s) may not overlap (1403) or overlap (1404) with communication BWP. Sensing BWP(s) may include communication BWP(s) or may be included within communication BWP(s). With the given slot format indication, there can be an association of a certain BWP with a certain time slot. In that case, the BWP switching for communication and sensing can be implicitly assumed at the UE. Alternatively, there could be a separate indication on the BWP switching between communication and sensing.

Figure 15:
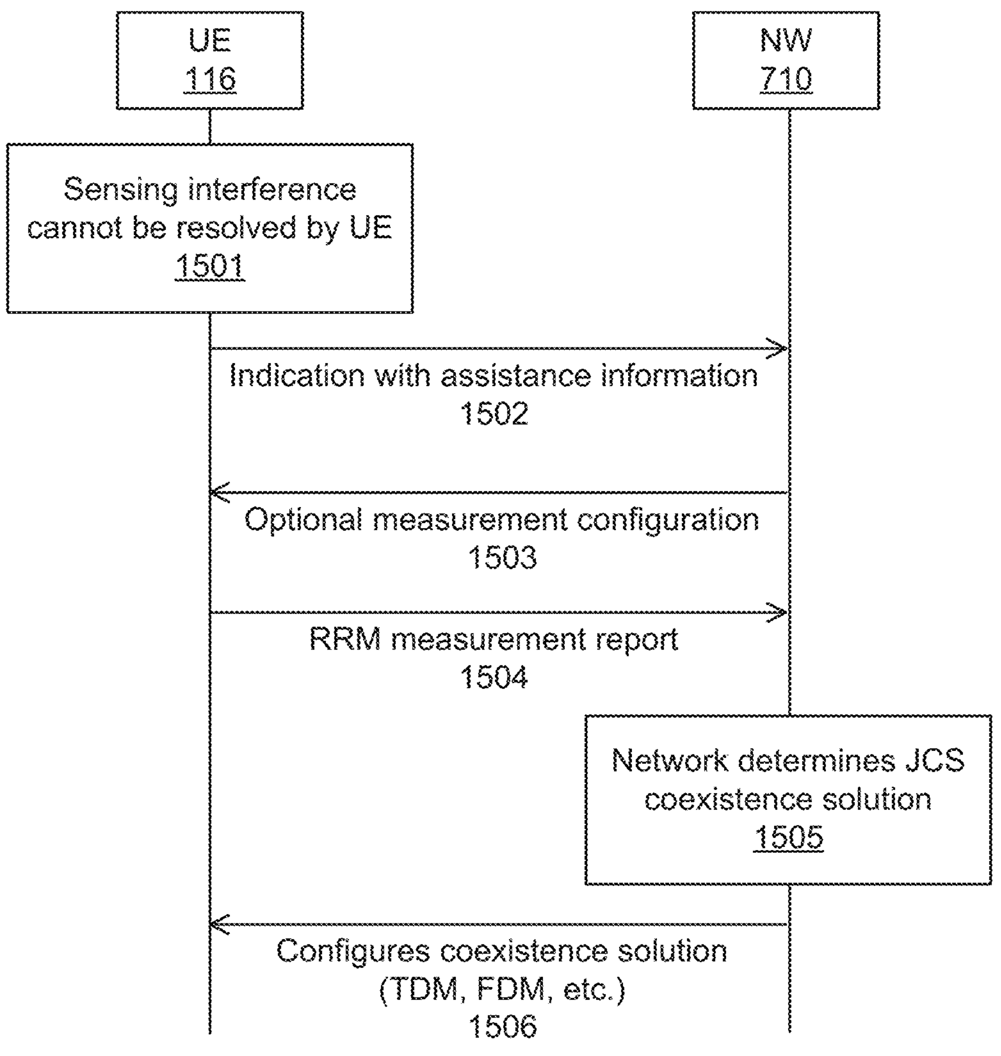
FIG. 15 illustrates a high level diagram of signal flow for a procedure to resolve JCS coexistence issues according to various embodiments of this disclosure.

FIG. 15 illustrates a high level diagram of signal flow for a procedure to resolve JCS coexistence issues according to various embodiments of this disclosure. The embodiment of FIG. 15 is for illustration only. Other embodiments of signaling could be used without departing from the scope of this disclosure.

FIG. 15 is an example procedure 1500 between the UE and the NW to handle joint communication and sensing coexistence issue. If a cellular system is determined to be experiencing co-channel or adjacent-channel interference from a sensing system or vice versa 1501, in one embodiment, the UE indicates the coexistence issue to the network 1502, with assistance information including frequencies experiencing the coexistence issue, interference level, desired TDM pattern to avoid the coexistence issue, e.g., in a bitmap, etc. Upon the reception of coexistence issue report, the NW can send an optional RRM measurement configuration to UE 1503 to determine and specify the cause of the issue. With the optional RRM measurement report from the UE 1504, the NW determines an appropriate coexistence solution 1505 and configures the solution to the UE 1506. In one embodiment, the solution can be in the time domain via separating the time domain resource(s) for communication and the time domain resource(s) for sensing. Such time domain resource separation can be either for co-channel or adjacent channel operations of communication and sensing functions. In another embodiment, the solution can be in the frequency domain, in which the network indicates the UE to move sensing operation from one frequency to another frequency or to move communication operation from one frequency to another frequency.

Figure 16:
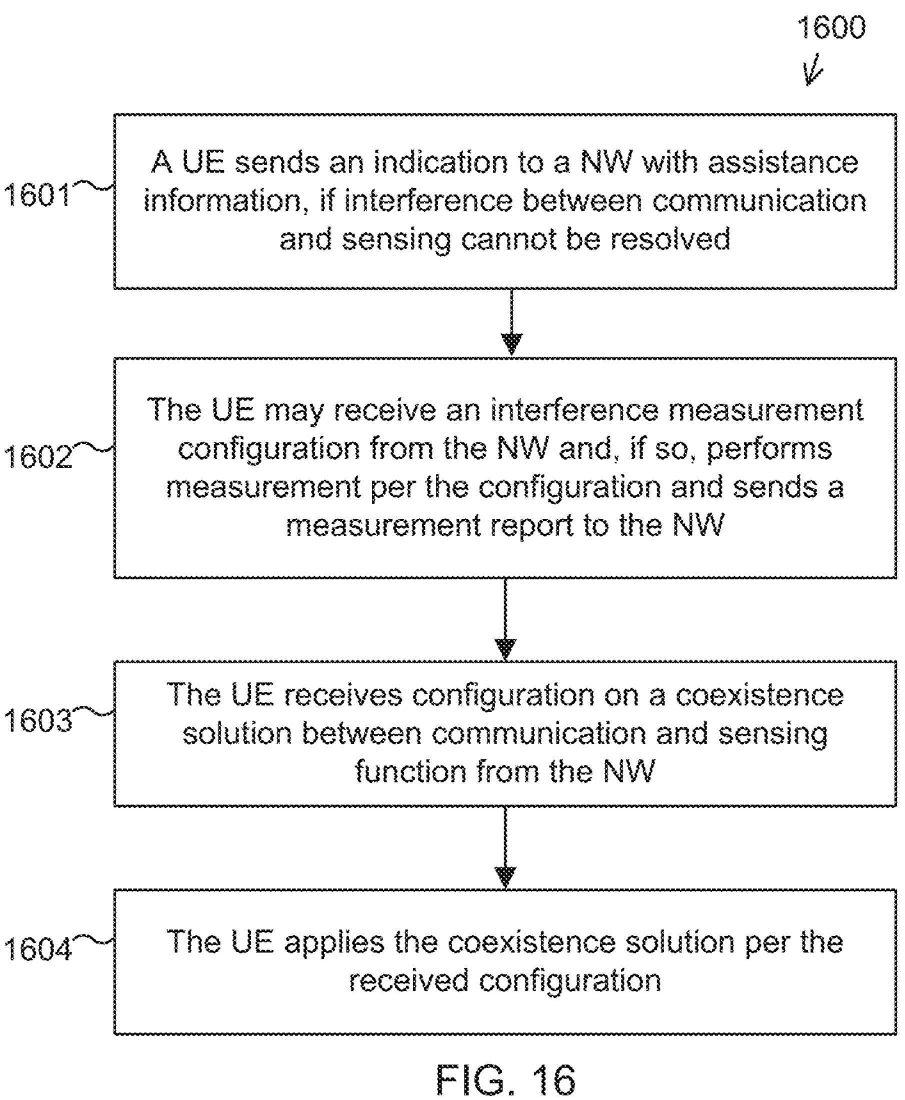
FIG. 16 illustrates a high level flowchart for UE operation of handling joint communication and sensing coexistence issues according to various embodiments of this disclosure.

FIG. 16 illustrates a high level flowchart for UE operation of handling joint communication and sensing coexistence issues according to various embodiments of this disclosure. The embodiment of FIG. 16 is for illustration only. Other embodiments of the process 1600 could be used without departing from the scope of this disclosure.

FIG. 16 is an example of a method 1600 for handling joint communication and sensing coexistence issue from a UE perspective consistent with other embodiments disclosed herein. In 1601, a UE sends an indication to a NW with assistance information, if interference between communication and sensing cannot be resolved. In 1602, the UE may receive an interference measurement configuration from the NW and, if so, performs measurement according to the configuration and sends a measurement report to the NW. In 1603, the UE receives configuration on a coexistence solution between communication and sensing function from the NW. In 1604, the UE applies the coexistence solution according to the received configuration.

Figure 17:
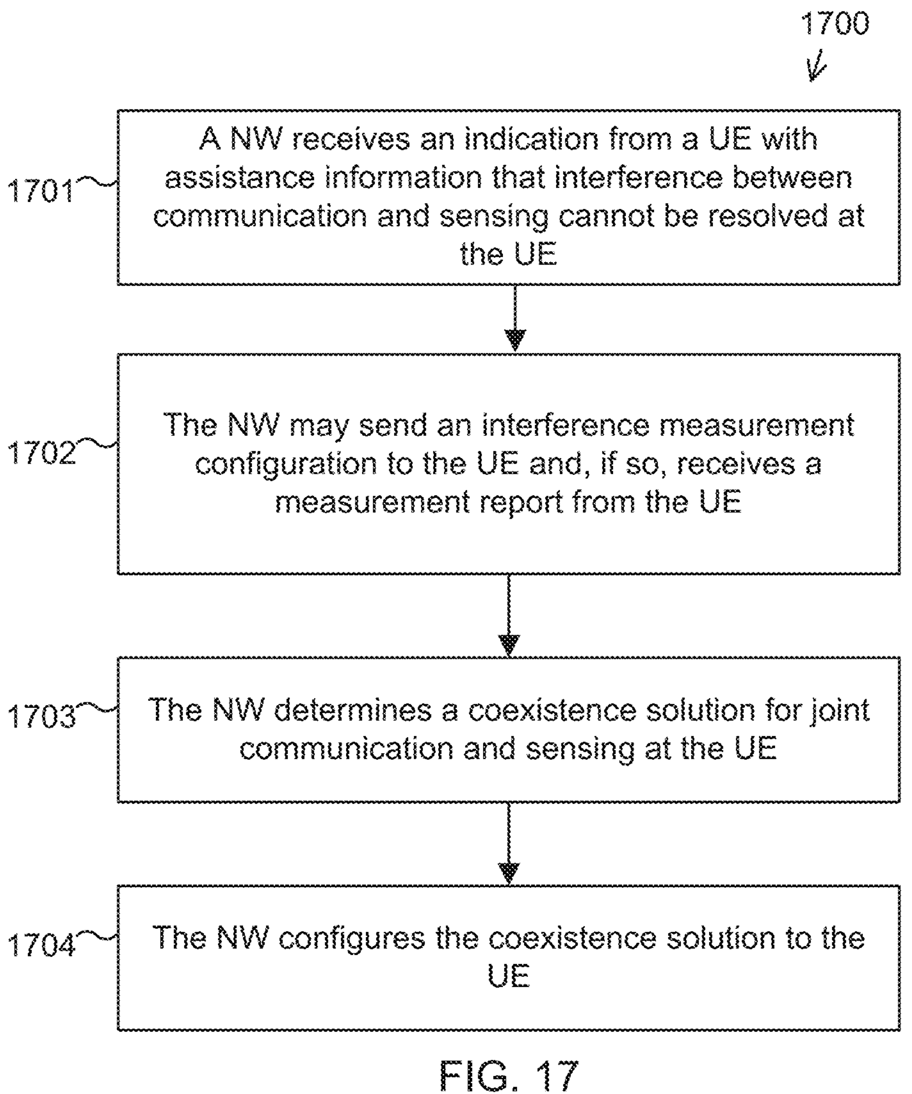
FIG. 17 illustrates a high level flowchart for NW operation of handling joint communication and sensing coexistence issues according to various embodiments of this disclosure.

FIG. 17 illustrates a high level flowchart for NW operation of handling joint communication and sensing coexistence issues according to various embodiments of this disclosure. The embodiment of FIG. 17 is for illustration only. Other embodiments of the process 1700 could be used without departing from the scope of this disclosure.

FIG. 17 is an example of a method 1700 for handling joint communication and sensing coexistence issue from a NW perspective consistent with embodiments disclosed herein. At 1701, a NW receives an indication from a UE, with assistance information, that interference between communication and sensing cannot be resolved at the UE. At 1702, the NW may send an interference measurement configuration to the UE and, if so, receives a measurement report from the UE. At 1703, the NW determines a coexistence solution for joint communication and sensing at the UE. At 1704, the NW configures the coexistence solution to the UE.

In one embodiment, the frequency domain solution includes UE handover to frequencies not interfered by sensing or avoiding UE handover to frequencies interfered by sensing based on UE assistance information or RRM measurement report.

Figure 18:
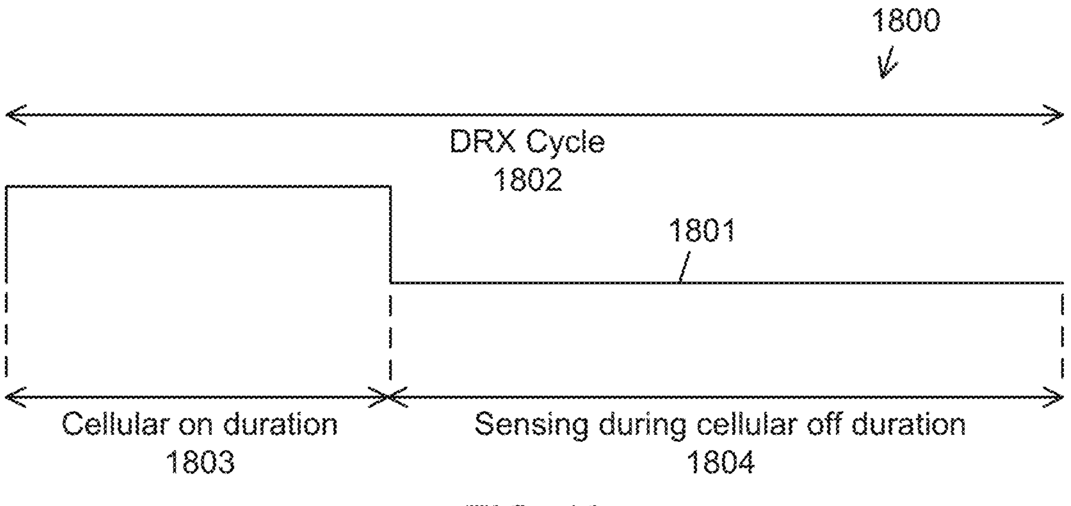
FIG. 18 illustrates an example TDM of JCS via DRX configuration according to various embodiments of this disclosure.

FIG. 18 illustrates an example TDM of JCS via DRX configuration according to various embodiments of this disclosure. The embodiment of FIG. 18 is for illustration only. Other embodiments of the configuration 1800 could be used without departing from the scope of this disclosure.

As an example of a time domain coexistence solution, as illustrated in FIG. 18, the UE can be configured with DRX operation 1801 with short/long DRX cycle 1802 and inactivity timers. During the DRX on duration 1803, the UE does not perform sensing. During the DRX off duration 1804, while not required to monitor cellular DL signals, the UE can perform sensing. As another time domain solution, the UE can be configured with reserved resource "R" in the slot format indication for performing sensing while not required to monitor cellular DL signals.

Embodiments of the disclosure for supporting joint communication and radar sensing in wireless communication systems are summarized in the following and are fully elaborated further below.

- Method and apparatus for sensing signal configuration including waveform, cyclic shift, frequency tones, tone spacing, directionality, time gap between consecutive signal transmissions, etc.
- Method and apparatus for reusing RSs (Reference Signals) defined in cellular systems, e.g., SRS, DMRS, PT-RS, etc., for the purpose of sensing signal.
- Method and apparatus for reusing beamformed SRS transmission for directional sensing.

Figure 19:
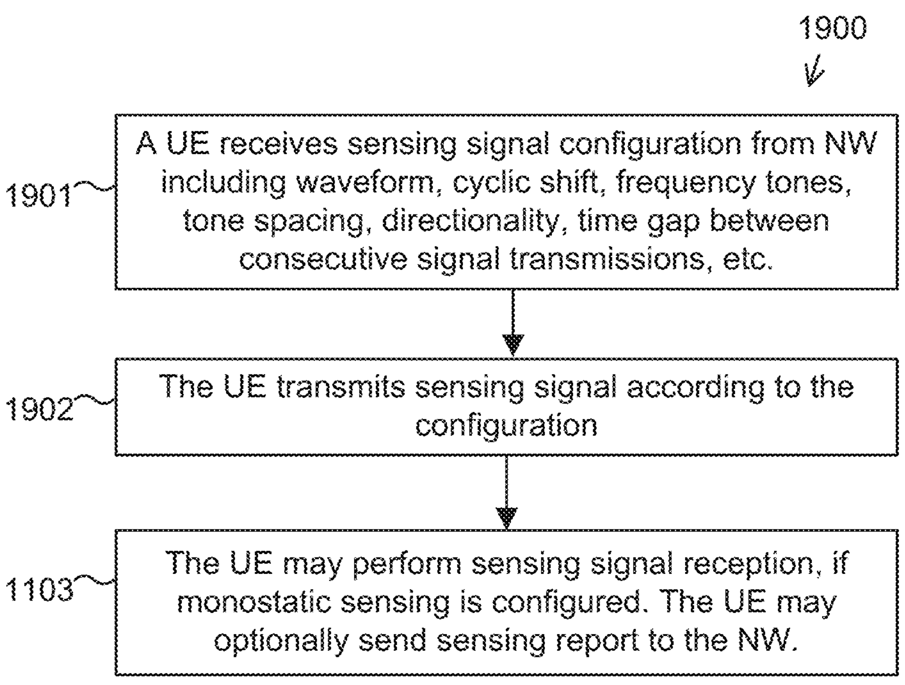
FIG. 19 illustrates a high level flowchart for UE operation of sensing signal configuration according to various embodiments of this disclosure.

FIG. 19 illustrates a high level flowchart for UE operation of sensing signal configuration according to various embodiments of this disclosure. The embodiment of FIG. 19 is for illustration only. Other embodiments of the process 1900 could be used without departing from the scope of this disclosure.

FIG. 19 is an example of a method 1900 for sensing signal configuration from a UE perspective consistent with other embodiments disclosed herein. At 1901, a UE receives a sensing signal configuration from NW including waveform, cyclic shift, frequency tones, tone spacing, directionality, time gap between consecutive signal transmissions, etc. In one embodiment, the UE can use any signal, including data and RSs, defined and/or transmitted for communication purpose for the purpose of sensing. Examples of RSs include but not limited to SRS, DMRS, PT-RS, etc. The NW can also configure the UE with sequences to be used for the sensing signal, e.g., Zadoff-Chu, gold, m-sequences, etc., including cyclic shift. The NW can configure the UE with frequency tones and/or tone spacing on which the sensing signal is loaded. In one embodiment, a set of interlaced tones can be predefined and configured to UE. The definition of interlace can be based on the comb structure defined for SRS transmission in cellular system. The directionality configuration can include the number of directional sensing signal transmission, allowed beam-width, antenna gain, etc. Time gap between consecutive signal transmissions is configured if the UE operates monostatic sensing. If the UE operates bi-static sensing, it may be that no gap is configured between sensing signal transmissions. At 1902, the UE transmits sensing signal according to the configuration. At 1903, the UE may switch to reception mode, receives returned sensing signal, and perform object detection if monostatic sensing is performed. The UE may optionally send sensing report to the NW. If the UE performs sensing signal transmission only as a part of bi-static sensing, 1903 can be omitted.

Figure 20:
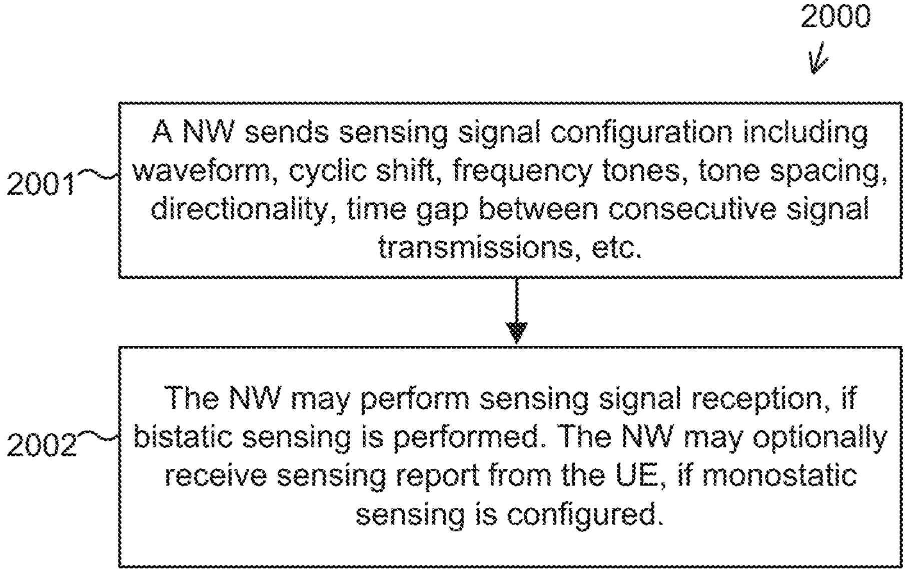
FIG. 20 illustrates a high level flowchart for NW operation of sensing signal configuration according to various embodiments of this disclosure.

FIG. 20 illustrates a high level flowchart for NW operation of sensing signal configuration according to various embodiments of this disclosure. The embodiment of FIG. 20 is for illustration only. Other embodiments of the process 2000 could be used without departing from the scope of this disclosure.

FIG. 20 is an example of a method 2000 for sensing signal configuration from a NW perspective consistent with other embodiments disclosed herein. At 2001, the NW sends a sensing signal configuration to the UE, including waveform, cyclic shift, frequency tones, tone spacing, directionality, time gap between consecutive signal transmissions, etc. In one embodiment, the UE can use any signal, including data and RSs, defined and/or transmitted for communication purpose for the purpose of sensing. Examples of RSs include but not limited to SRS, DMRS, PT-RS, etc. The NW can also configure the UE with sequences to be used for the sensing signal, e.g., Zadoff-Chu, gold, m-sequences, etc., including cyclic shift. The NW can configure the UE with frequency tones and/or tone spacing on which the sensing signal is loaded. In one embodiment, a set of interlaced tones can be predefined and configured to UE. The definition of interlace can be based on the comb structure defined for SRS transmission in cellular system. The directionality configuration can include the number of directional sensing signal transmission, allowed beam-width, antenna gain, etc. Time gap between consecutive signal transmissions is configured if the UE operates monostatic sensing. In one embodiment, the UE and the NW can perform bi-static sensing in which the UE transmits the sensing signal and the NW receives the sensing signal transmitted by the UE. In such a case, in 2002, the network may perform sensing signal reception and object detection. If the UE performs monostatic sensing by itself, the NW may receive sensing report from the UE.

Figure 21:
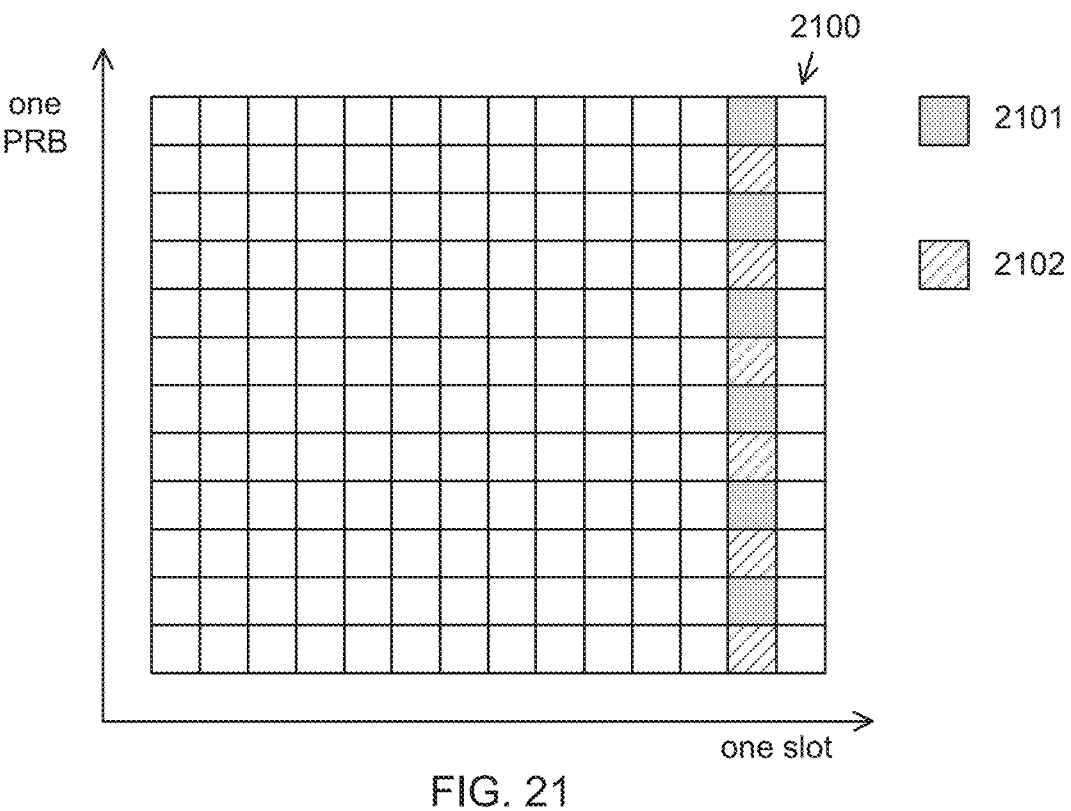
FIGS. 21 and 22 illustrate examples of SRS with comb-2 and with comb-4, respectively, for sensing signal according to various embodiments of this disclosure.
Figure 22:
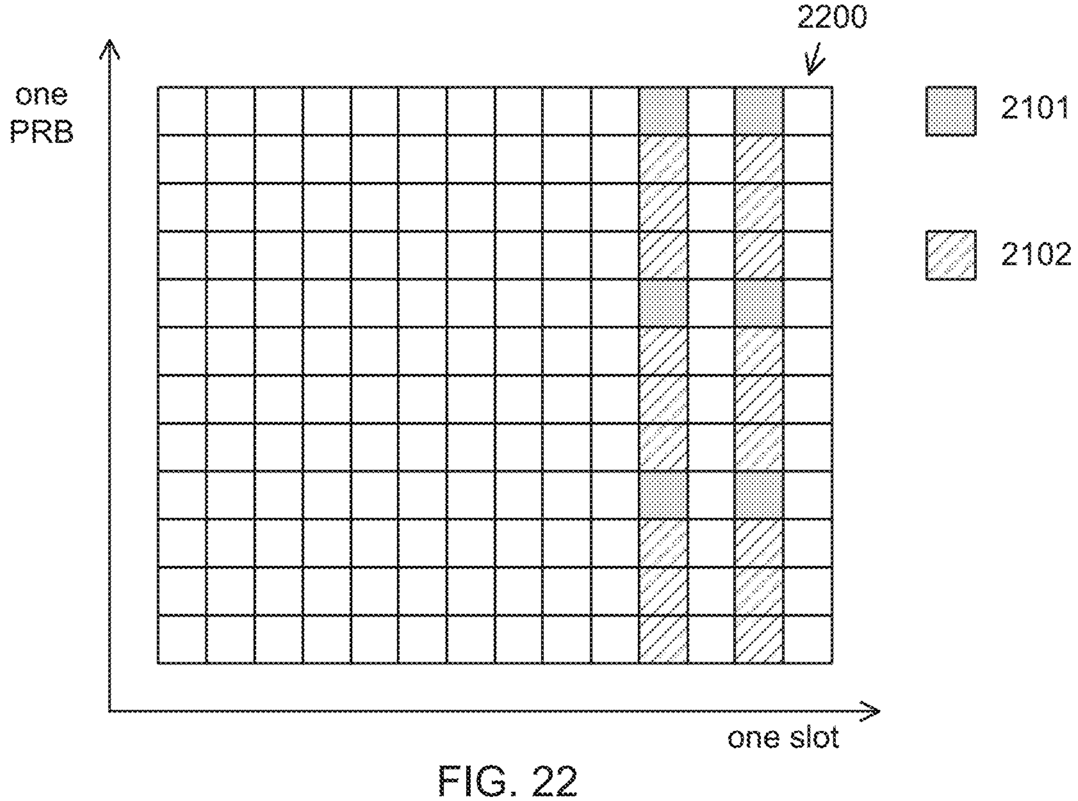

FIGS. 21 and 22 illustrate examples of SRS with comb-2 and with comb-4, respectively, for sensing signal according to various embodiments of this disclosure. The embodiments of FIGS. 21 and 22 are for illustration only. Other embodiments of the configurations 2100 and 2200 could be used without departing from the scope of this disclosure.

FIGS. 21 and 22 are examples of sensing signal using SRS with comb-2 and comb-4, respectively, consistent with other embodiments disclosed herein. With Comb-N, the UE transmits sensing signal 2101 on every N tones for the indicated frequency range by NW. The remaining other tones 2102 can be used by other UEs, or the UE transmitting sensing signal, for the sensing signal transmission, SRS transmission, or data transmission. In one embodiment, the next symbol in the time domain following the symbol 2101 for sensing signal transmission may be left blank for the reception of returning sensing signal in the case of monostatic sensing. In the case of bi-static sensing, there may be no blank symbol and the UE may be configured for consecutive time domain symbols for continuous sensing signal transmission.

In one embodiment, the UE may receive separate configurations for SRS transmission for the purpose of sensing and for the purpose of channel sounding by NW. In this case, the UE can be configured with separate power control parameters and maintain separate closed loop power control values from the SRS configured for channel sounding.

- $P_{CMAX}$: The UE can be configured with separate maximum output power for the purpose of sensing and channel sounding. Separate configuration can be due to separate RF chain for sensing and channel sounding or it can be due to particular sensing use case, e.g., proximity sensing. The NW configuration can be based on the capability and sensing request indication from the UE as exemplified in TABLE 1 and 2.
- $P_0$: The UE can be configured with separate received power target value for the purpose of sensing and channel sounding. This is because the SRS for channel sounding is intended to be received by the NW while SRS for sensing can be different depends on the setting, e.g., the intended recipient is the transmitting UE itself for monostatic sensing or the intended recipient can be another UE or NW if bi-static sensing is performed.
- $\alpha$: the fractional power control factor can be separately configured for the purpose of sensing and channel sounding depending on the target object type, target sensing scenario, etc.
- $\delta$: the TPC command can be separately signaled to the UE for the purpose of sensing and channel sounding. A new RNTI can be defined, e.g., Sensing-TPC-RNTI, for the purpose of sensing transmit power control, separate from SRS-TPC-RNTI.

The UE may be configured with different configuration for SRS for sensing or share the same configuration for channel sounding on time domain symbol span, i.e., 1, 2, or 4 symbols, time domain symbol starting position, frequency domain comb values, i.e., 2 or 4, frequency hopping pattern, numerology including sub-carrier spacing, frequency range for signal transmission or cyclic shift.

Regardless of whether the UE is configured with separate SRS configurations for sensing and channel sounding, the NW can utilize the received SRS for channel sounding although intended for sensing by UE.

In another embodiment, the sensing signal can be frequency multiplexed with data signal. In this case, the returning sensing signal detection may be performed by first separating tones used for sensing from the rest in the frequency domain.

Figure 23:
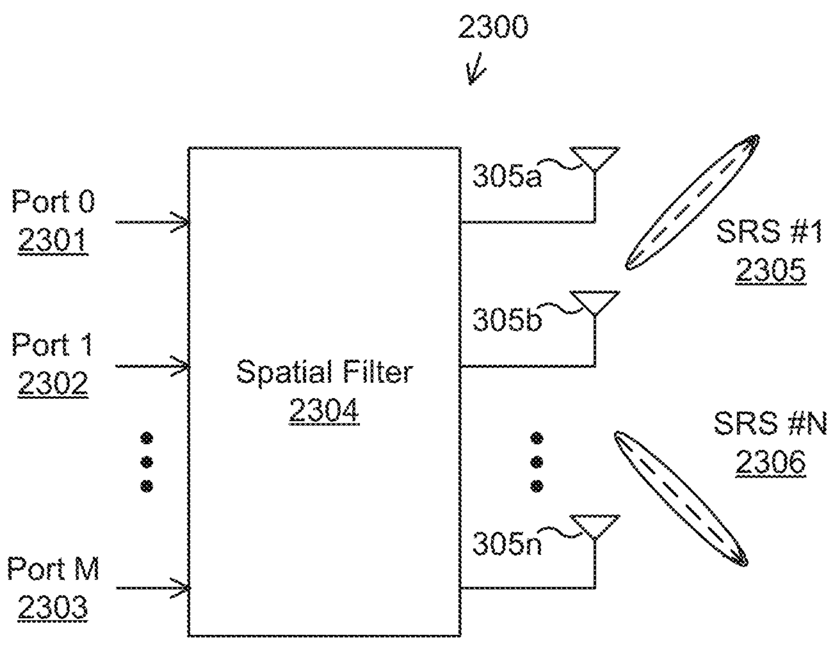
FIG. 23 illustrates an example of beamformed SRS transmission according to various embodiments of this disclosure.

FIG. 23 illustrates an example of beamformed SRS transmission according to various embodiments of this disclosure. The embodiment of FIG. 23 is for illustration only. Other embodiments of the configuration 2300 could be used without departing from the scope of this disclosure.

FIG. 23 is an example of beamformed SRS transmission in cellular system via a combination of precoder and spatial filter. Antenna port 0 2301, antenna port 1 2302, through antenna port M 2303 supply signals to spatial filter 2304 for transmission on antenna 305*a*, 305*b*, through 305*n*. In the example shown, SRS #1 2305 and SRS #N 2306 are transmitted. In one embodiment, the beamformed SRS can be used for sensing purpose. The UE can be configured with a set of ports for sensing and a set of ports for channel sounding, possibly having a non-empty interaction between the two sets.

Figure 24:
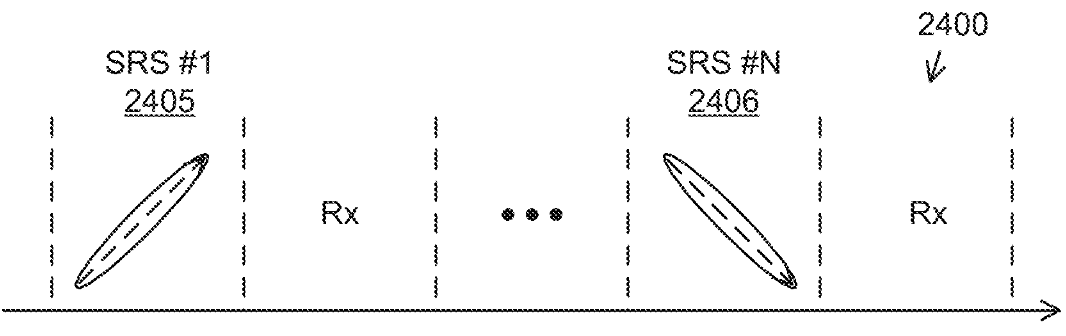
FIG. 24 illustrates an exemplary use of beamformed SRS transmission for monostatic sensing according to various embodiments of this disclosure.

FIG. 24 illustrates an exemplary use of beamformed SRS transmission for monostatic sensing according to various embodiments of this disclosure. The embodiment of FIG. 24 is for illustration only. Other embodiments of the configuration 2400 could be used without departing from the scope of this disclosure.

FIG. 24 is an example in which a UE is configured with N SRS ports (SRS #1 2405 and SRS #N 2406), or equivalently beam directions, for sensing. The UE performs cycling of configured SRS beam directions for sensing signal transmission.

Figure 25:
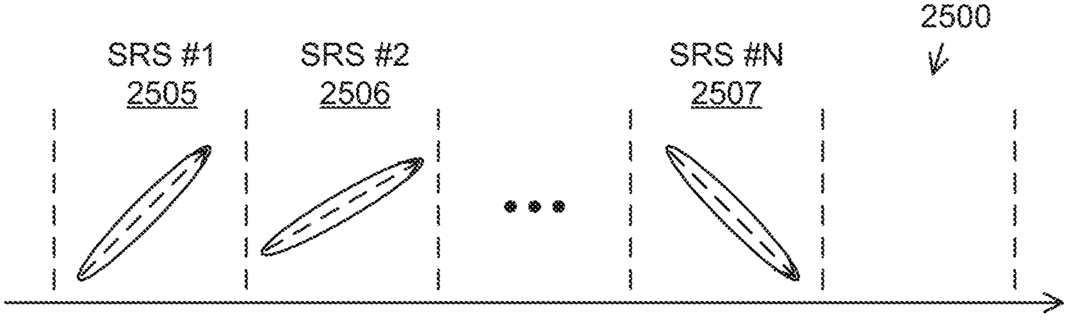
FIG. 25 illustrates an exemplary use of beamformed SRS transmission for bi-static sensing according to various embodiments of this disclosure.

FIG. 25 illustrates an exemplary use of beamformed SRS transmission for bi-static sensing according to various embodiments of this disclosure. The embodiment of FIG. 25 is for illustration only. Other embodiments of the configuration 2500 could be used without departing from the scope of this disclosure.

FIG. 24 is drawn for the case of monostatic sensing and, as a result, a gap is configured between consecutive sensing signal transmission for the purpose of returned signal reception. If the UE is configured as a transmitter in bi-static sensing, there may be no gap between consecutive signal transmission (SRS #1 2505, SRS #2 2506, through SRS #N 2507), other than beam redirection time needed for the hardware, configured for sensing signal reception as illustrated in FIG. 25.

FIGS. 26A and 26B illustrate an example of sub-symbol level sensing signal configuration with comb-2 interlace according to various embodiments of this disclosure. FIGS. 27A and 27B illustrate an example of sub-symbol level sensing signal configuration with comb-4 interlace according to various embodiments of this disclosure. The embodiments of FIGS. 26A and 26B and of FIGS. 27A and 27B are for illustration only. Other embodiments of the signal configuration could be used without departing from the scope of this disclosure.

When sensing signal is sent on interlaced tones with Comb-N, not multiplexed with other signal on other tones, the same signal with reduced span repeats N times within a given symbol duration. Repeated copies 2601, 2602 of a signal with comb-2 are depicted in FIG. 26A, and repeated copies 2701, 2702, 2703, 2704 of a signal with comb-4 are depicted in FIG. 27A. In one embodiment, the NW may choose N to acquire a desired sensing transmission signal span considering the distance to the target object and expected signal return time. As shortened signal repeats within a given symbol duration, in one embodiment, the network may configure sub-symbol level sensing signal transmission and reception. That is, the UE can be configured to transmit to different beam directions as in FIG. 25 rather than transmitting repeatedly, or configured to receive returned signals as in FIG. 24 for monostatic sensing. That is, the repeated copies 2601, 2602 and 2701, 2702, 2703, 2704 may be transmitted in different directions. Accordingly, signals 2603, 2705 may be used for sensing while signals 2604, 2706, 2707, and 2708 may be used for either sensing reception or sensing from different beam directions.

For illustrative purposes the steps of algorithms above are described serially. However, some of these steps may be performed in parallel to each other. The operation diagrams illustrate example methods that can be implemented in accordance with the principles of the present disclosure and various changes could be made to the methods illustrated in the flowcharts. For example, while shown as a series of steps, various steps in each figure could overlap, occur in parallel, occur in a different order, or occur multiple times. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method, comprising:

receiving, at a user equipment (UE), a time domain resource configuration indicating a time domain resource for sensing operations by the UE;

receiving, at the UE, a frequency domain resource configuration indicating a bandwidth part (BWP) for the sensing operations by the UE;

performing, at the UE, the sensing operations using the indicated time domain resource and the indicated bandwidth part;

transmitting, by the UE, assistance information relating to interference between the sensing operations by the UE and cellular communication by the UE; and receiving an interference measurement configuration for measurement by the UE of the interference.

2. The method of claim 1, wherein:

the time domain resource configuration includes a sensing type indicator S for the time domain resource for sensing operations by the UE, the time domain resource configuration indicates that dynamic triggering of sensing is allowed within one or more time domain resources, and the time domain resource configuration is one of a plurality of slot format indicators for a pattern of time domain resources allocated for one of downlink (DL) data reception by the UE, uplink (UL) data transmission by the UE, sensing transmission by the UE, or sensing reception by the UE.

3. The method of claim 1, wherein:

the BWP for the sensing operations by the UE comprises a BWP defined by a cellular communication system, the BWP for the sensing operations by the UE comprises one or more BWPs that may be selectively activated for the sensing operations by the UE, and the BWP for the sensing operations by the UE overlaps a BWP used for cellular communication by the UE.

4. The method of claim 1, further comprising:

receiving a configuration for coexistence of the sensing operations by the UE and the cellular communication by the UE.

5. The method of claim 1, wherein the assistance information indicates frequencies with interference issues, an interference level, and a desired time domain multiplexing (TDM) pattern, and wherein the configuration for coexistence of the sensing operations by the UE and the cellular communication by the UE comprises one of a frequency domain multiplexing (FDM) operation including handover of the UE to frequencies not interfering with the sensing operations by the UE, or a TDM operation configuring the UE with one of a discontinuous reception (DRX) operation for UE sensing during a DRX off duration, or a time domain resource reserved for the sensing operations by the UE.

6. The method of claim 1, further comprising:

receiving a sensing signal configuration including waveform, cyclic shift, frequency tones, tone spacing, directionality, and time gap between successive sensing signal transmissions;

transmitting sensing signals based on the received sensing signal configuration; and receiving, at the UE, one of a reflection of the transmitted sensing signals or a sensing report.

7. The method of claim 6, wherein:

the sensing signal configuration employs reference signal (RS) sequences used for cellular communication for the sensing operations by the UE, sensing signals for the sensing operations by the UE are multiplexed with one or more of sensing signals for another UE or data signals, sounding reference signals (SRSs) used for the sensing operations by the UE are transmitted on separate resources from SRSs for channel measurement, and SRSs used for the sensing operations by the UE are transmitted with different power than SRSs for channel measurement.

8. The method of claim 6, wherein:

sounding reference signals (SRSs) used for the sensing operations by the UE are transmitted on separate beams with a time gap therebetween, and antenna ports used for the sensing operations by the UE are different from antenna ports for channel measurement and utilize a different cyclic shift, and the UE is configured to transmit sensing signals or receive reflected sensing signals for a fraction of a symbol duration.

9. A user equipment (UE), comprising:

a transceiver configured to receive a time domain resource configuration indicating a time domain resource for sensing operations by the UE, and receive a frequency domain resource configuration indicating a bandwidth part (BWP) for the sensing operations by the UE; and a processor operably coupled to the transceiver, the processor configured to perform the sensing operations using the indicated time domain resource and the indicated bandwidth part, wherein the transceiver is further configured to:

transmit assistance information relating to interference between the sensing operations by the UE and cellular communication by the UE, and receive an interference measurement configuration for measurement by the UE of the interference.

10. The UE of claim 9, wherein:

the time domain resource configuration includes a sensing type indicator S for the time domain resource for sensing operations by the UE, the time domain resource configuration indicates that dynamic triggering of sensing is allowed within one or more time domain resources, and the time domain resource configuration is one of a plurality of slot format indicators for a pattern of time domain resources allocated for one of downlink (DL) data reception by the UE, uplink (UL) data transmission by the UE, sensing transmission by the UE, or sensing reception by the UE.

11. The UE of claim 9, wherein:

the BWP for the sensing operations by the UE comprises a BWP defined by a cellular communication system, the BWP for the sensing operations by the UE comprises one or more BWPs that may be selectively activated for the sensing operations by the UE, and the BWP for the sensing operations by the UE overlaps a BWP used for cellular communication by the UE.

12. The UE of claim 9, wherein the transceiver is further configured to:

receive a configuration for coexistence of the sensing operations by the UE and the cellular communication by the UE.

13. The UE of claim 9, wherein the assistance information indicates frequencies with interference issues, an interference level, and a desired time domain multiplexing (TDM) pattern, and wherein the configuration for coexistence of the sensing operations by the UE and the cellular communication by the UE comprises one of a frequency domain multiplexing (FDM) operation including handover of the UE to frequencies not interfering with the sensing operations by the UE, or a TDM operation configuring the UE with one of a discontinuous reception (DRX) operation for UE sensing during a DRX off duration, or a time domain resource reserved for the sensing operations by the UE.

14. The UE of claim 9, wherein the transceiver is further configured to:

receive a sensing signal configuration including waveform, cyclic shift, frequency tones, tone spacing, directionality, and time gap between successive sensing signal transmissions;

transmit sensing signals based on the received sensing signal configuration; and receive, at the UE, one of a reflection of the transmitted sensing signals or a sensing report.

15. The UE of claim 14, wherein:

the sensing signal configuration employs reference signal (RS) sequences used for cellular communication for the sensing operations by the UE, sensing signals for the sensing operations by the UE are multiplexed with one or more of sensing signals for another UE or data signals, sounding reference signals (SRSs) used for the sensing operations by the UE are transmitted on separate resources from SRSs for channel measurement, and SRSs used for the sensing operations by the UE are transmitted with different power than SRSs for channel measurement.

16. The UE of claim 14, wherein:

sounding reference signals (SRSs) used for the sensing operations by the UE are transmitted on separate beams with a time gap therebetween, and antenna ports used for the sensing operations by the UE are different from antenna ports for channel measurement and utilize a different cyclic shift, and the UE is configured to transmit sensing signals or receive reflected sensing signals for a fraction of a symbol duration.

17. A base station (BS), comprising:

a transceiver configured to transmit a time domain resource configuration indicating a time domain resource for sensing operations by a user equipment (UE), and transmit a frequency domain resource configuration indicating a bandwidth part (BWP) for the sensing operations by the UE, wherein sensing operations are performed using the indicated time domain resource and the indicated bandwidth part, and wherein the transceiver is further configured to:

receive assistance information relating to interference between the sensing operations by the UE and cellular communication by the UE, and transmit an interference measurement configuration for measurement by the UE of the interference.

18. The BS of claim 17, wherein:

the time domain resource configuration includes a sensing type indicator S for the time domain resource for sensing operations by the UE, the time domain resource configuration indicates that dynamic triggering of sensing is allowed within one or more time domain resources, and the time domain resource configuration is one of a plurality of slot format indicators for a pattern of time domain resources allocated for one of downlink (DL) data reception by the UE, uplink (UL) data transmission by the UE, sensing transmission by the UE, or sensing reception by the UE.

19. The BS of claim 17, wherein:

the BWP for the sensing operations by the UE comprises a BWP defined by a cellular communication system, the BWP for the sensing operations by the UE comprises one or more BWPs that may be selectively activated for the sensing operations by the UE, and the BWP for the sensing operations by the UE overlaps a BWP used for cellular communication by the UE.

20. The BS of claim 17, wherein the transceiver is further configured to:

transmit a configuration for coexistence of the sensing operations by the UE and the cellular communication by the UE.

* * * * *